United States Patent
Marcouiller et al.

(10) Patent No.: US 11,609,400 B2
(45) Date of Patent: *Mar. 21, 2023

(54) FIBER OPTIC CIRCUIT AND PREPARATION METHOD

(71) Applicant: COMMSCOPE TECHNOLOGIES LLC, Hickory, NC (US)

(72) Inventors: Thomas Marcouiller, Shakopee, MN (US); Paula Lockhart, New Prague, MN (US); Wouter Vranken, Nieuwrode (BE); Koen Vuerinckx, Holsbeek (BE); Laurens Izaäk Van Wuijckhuijse, Eden Prairie, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/855,153

(22) Filed: Jun. 30, 2022

(65) Prior Publication Data

US 2022/0326466 A1 Oct. 13, 2022

Related U.S. Application Data

(63) Continuation of application No. 16/753,268, filed as application No. PCT/US2018/053935 on Oct. 2, 2018, now Pat. No. 11,409,068.

(60) Provisional application No. 62/566,906, filed on Oct. 2, 2017.

(51) Int. Cl.
*G02B 6/44* (2006.01)
*G02B 6/36* (2006.01)

(52) U.S. Cl.
CPC ......... *G02B 6/4471* (2013.01); *G02B 6/3652* (2013.01); *G02B 6/3684* (2013.01); *G02B 6/4403* (2013.01); *G02B 6/448* (2013.01)

(58) Field of Classification Search
CPC ... G02B 6/4281; G02B 6/4453; G02B 6/3608
See application file for complete search history.

(56) References Cited

U.S. PATENT DOCUMENTS

| 3,330,105 A | 7/1967 | Weber |
| 4,359,262 A | 11/1982 | Dolan |
| 4,502,754 A | 3/1985 | Kawa |

(Continued)

FOREIGN PATENT DOCUMENTS

| AU | 40995/85 | 4/1985 |
| AU | 55314/86 | 3/1986 |

(Continued)

OTHER PUBLICATIONS

"ADC OMX 600 Optical Distribution Frame Solution," ADC Telecommunications, Inc., Publication No. 856, 8 pgs. (Feb. 2000).

(Continued)

*Primary Examiner* — Eric Wong
(74) *Attorney, Agent, or Firm* — Merchant & Gould P.C.

(57) ABSTRACT

A method of preparing a preformed fiber optic circuit for later termination to at least one fiber optic connector includes providing a substrate for supporting a plurality of optical fibers, the substrate including at least one layer of flexible foil, wherein the flexible foil may be formed from polyethylene terephthalate (PET) according to one example and peeling a layer including at least the optical fibers from the at least one layer of flexible foil.

25 Claims, 20 Drawing Sheets

(56) References Cited

U.S. PATENT DOCUMENTS

| | | |
|---|---|---|
| 4,585,303 A | 4/1986 | Pinsard et al. |
| 4,595,255 A | 6/1986 | Bhatt et al. |
| 4,630,886 A | 12/1986 | Lauriello et al. |
| 4,697,874 A | 10/1987 | Nozick |
| 4,699,455 A | 10/1987 | Erbe et al. |
| 4,708,430 A | 11/1987 | Donaldson et al. |
| 4,717,231 A | 1/1988 | Dewez et al. |
| 4,725,120 A | 2/1988 | Parzygnat |
| 4,733,936 A | 3/1988 | Mikolaicyk et al. |
| 4,736,100 A | 4/1988 | Vastagh |
| 4,747,020 A | 5/1988 | Brickley et al. |
| 4,765,710 A | 8/1988 | Burmeister et al. |
| 4,792,203 A | 12/1988 | Nelson et al. |
| 4,824,196 A | 4/1989 | Bylander |
| 4,840,449 A | 6/1989 | Ghandeharizadeh |
| 4,861,134 A | 8/1989 | Alameel et al. |
| 4,900,123 A | 2/1990 | Barlow et al. |
| 4,948,220 A | 8/1990 | Violo et al. |
| 4,971,421 A | 11/1990 | Ori |
| 4,986,762 A | 1/1991 | Keith |
| 4,989,946 A | 2/1991 | Williams et al. |
| 4,995,688 A | 2/1991 | Anton et al. |
| 5,011,257 A | 4/1991 | Wettengel et al. |
| 5,023,646 A | 6/1991 | Ishida et al. |
| 5,058,983 A | 10/1991 | Corke et al. |
| 5,067,784 A | 11/1991 | Debortoli et al. |
| 5,071,211 A | 12/1991 | Debortoli et al. |
| 5,073,042 A | 12/1991 | Mulholland et al. |
| 5,076,688 A | 12/1991 | Bowen et al. |
| 5,100,221 A | 3/1992 | Carney et al. |
| 5,107,627 A | 4/1992 | Mock, Jr. et al. |
| 5,109,447 A | 4/1992 | Chan |
| 5,127,082 A | 6/1992 | Below et al. |
| 5,129,021 A | 7/1992 | Mortimore et al. |
| 5,129,030 A | 7/1992 | Petrunia |
| 5,138,688 A | 8/1992 | Debortoli |
| 5,142,598 A | 8/1992 | Tabone |
| 5,142,606 A | 8/1992 | Carney et al. |
| 5,155,785 A | 10/1992 | Holland et al. |
| 5,160,188 A | 11/1992 | Rorke et al. |
| 5,167,001 A | 11/1992 | Debortoli et al. |
| 5,179,618 A | 1/1993 | Anton |
| 5,204,925 A | 4/1993 | Bonanni et al. |
| 5,208,885 A | 5/1993 | Dragone et al. |
| 5,212,761 A | 5/1993 | Petrunia |
| 5,214,735 A | 5/1993 | Henneberger et al. |
| 5,233,674 A | 8/1993 | Vladic |
| 5,235,665 A | 8/1993 | Marchesi et al. |
| 5,259,051 A | 11/1993 | Burack et al. |
| 5,274,729 A | 12/1993 | King et al. |
| 5,274,731 A | 12/1993 | White |
| 5,287,425 A | 2/1994 | Chang |
| 5,289,558 A | 2/1994 | Teichler et al. |
| 5,292,390 A | 3/1994 | Burack et al. |
| 5,317,663 A | 5/1994 | Beard et al. |
| 5,318,259 A | 6/1994 | Fussler |
| 5,323,478 A | 6/1994 | Milanowski et al. |
| 5,327,513 A | 7/1994 | Nguyen et al. |
| 5,333,221 A | 7/1994 | Briggs et al. |
| 5,333,222 A | 7/1994 | Belenkiy et al. |
| 5,335,349 A | 8/1994 | Kutsch et al. |
| 5,353,367 A | 10/1994 | Czosnowsk et al. |
| 5,359,688 A | 10/1994 | Underwood |
| 5,363,440 A | 11/1994 | Daoud |
| 5,363,465 A | 11/1994 | Korkowski et al. |
| 5,363,467 A | 11/1994 | Keith |
| 5,367,598 A | 11/1994 | Devenish, III et al. |
| 5,402,515 A | 3/1995 | Vidacovich et al. |
| 5,408,557 A | 4/1995 | Hsu |
| RE34,955 E | 5/1995 | Anton et al. |
| 5,412,751 A | 5/1995 | Siemon et al. |
| 5,420,958 A | 5/1995 | Henson et al. |
| 5,430,823 A | 7/1995 | Dupont et al. |
| 5,432,875 A | 7/1995 | Korkowski et al. |
| 5,438,641 A | 8/1995 | Malacarne |
| 5,442,726 A | 8/1995 | Howard et al. |
| 5,448,015 A | 9/1995 | Jamet et al. |
| 5,453,827 A | 9/1995 | Lee |
| 5,461,690 A | 10/1995 | Lampert |
| 5,469,526 A | 11/1995 | Rawlings |
| 5,475,215 A | 12/1995 | Hsu |
| 5,488,682 A | 1/1996 | Sauter et al. |
| 5,490,229 A | 2/1996 | Ghandeharizadeh et al. |
| 5,497,444 A | 3/1996 | Wheeler |
| 5,509,096 A | 4/1996 | Easley |
| 5,511,144 A | 4/1996 | Hawkins et al. |
| 5,521,992 A | 5/1996 | Chun et al. |
| 5,530,783 A | 6/1996 | Belopolsky et al. |
| 5,542,015 A | 7/1996 | Hultermans |
| 5,548,678 A | 8/1996 | Frost et al. |
| 5,570,450 A | 10/1996 | Fernandez et al. |
| 5,588,076 A | 12/1996 | Peacock et al. |
| 5,613,030 A | 3/1997 | Hoffer et al. |
| 5,636,138 A | 6/1997 | Gilbert et al. |
| 5,636,310 A | 6/1997 | Walles |
| 5,647,043 A | 7/1997 | Anderson et al. |
| 5,655,044 A | 8/1997 | Finzel et al. |
| 5,664,037 A | 9/1997 | Weidman |
| 5,682,452 A | 10/1997 | Takahashi |
| 5,687,266 A | 11/1997 | Leyssens et al. |
| 5,689,604 A | 11/1997 | Janus et al. |
| 5,708,751 A | 1/1998 | Mattei |
| 5,708,753 A | 1/1998 | Frigo et al. |
| 5,715,348 A | 2/1998 | Falkenberg et al. |
| 5,717,810 A | 2/1998 | Wheeler |
| 5,727,097 A | 3/1998 | Lee et al. |
| 5,734,776 A | 3/1998 | Puetz |
| 5,734,777 A | 3/1998 | Merriken et al. |
| 5,742,480 A | 4/1998 | Sawada et al. |
| 5,754,720 A | 5/1998 | Quinn et al. |
| 5,758,002 A | 5/1998 | Walters |
| 5,758,003 A | 5/1998 | Wheeler et al. |
| 5,764,839 A | 6/1998 | Igl et al. |
| 5,764,844 A | 6/1998 | Mendes |
| 5,774,245 A | 6/1998 | Baker |
| 5,774,612 A | 6/1998 | Belenkiy et al. |
| 5,781,686 A | 7/1998 | Robinson et al. |
| 5,784,515 A | 7/1998 | Tamaru et al. |
| 5,823,646 A | 10/1998 | Arizpe et al. |
| 5,825,955 A | 10/1998 | Ernst et al. |
| 5,841,917 A | 11/1998 | Jungerman et al. |
| 5,870,519 A | 2/1999 | Jenkins et al. |
| 5,878,179 A | 3/1999 | Schricker |
| 5,883,995 A | 3/1999 | Lu |
| 5,887,095 A | 3/1999 | Nagase et al. |
| 5,889,910 A | 3/1999 | Igl et al. |
| 5,898,811 A | 4/1999 | DiGiovanni et al. |
| 5,903,698 A | 5/1999 | Poremba et al. |
| 5,905,829 A | 5/1999 | Maenishi et al. |
| 5,909,526 A | 6/1999 | Roth et al. |
| 5,917,976 A | 6/1999 | Yamaguchi |
| 5,917,980 A | 6/1999 | Yoshimura et al. |
| 5,930,425 A | 7/1999 | Abel et al. |
| 5,945,633 A | 8/1999 | Ott et al. |
| 5,956,444 A | 9/1999 | Duda et al. |
| 5,966,492 A | 10/1999 | Bechamps et al. |
| 5,969,294 A | 10/1999 | Eberle et al. |
| 5,970,196 A | 10/1999 | Greveling et al. |
| 5,971,626 A | 10/1999 | Knodell et al. |
| 5,974,214 A | 10/1999 | Shacklette et al. |
| 5,975,769 A | 11/1999 | Larson et al. |
| 5,981,064 A | 11/1999 | Burack et al. |
| 5,987,203 A | 11/1999 | Abel et al. |
| 6,005,991 A | 12/1999 | Knasel |
| 6,012,852 A | 1/2000 | Kadar-Kallen et al. |
| 6,022,150 A | 2/2000 | Erdman et al. |
| 6,027,252 A | 2/2000 | Erdman et al. |
| 6,041,155 A | 3/2000 | Anderson et al. |
| 6,044,193 A | 3/2000 | Szentesi et al. |
| 6,061,492 A | 5/2000 | Strause et al. |
| 6,076,975 A | 6/2000 | Roth |
| 6,079,881 A | 6/2000 | Roth |
| 6,097,872 A | 8/2000 | Kusuda et al. |
| 6,149,315 A | 11/2000 | Stephenson |

(56) References Cited

U.S. PATENT DOCUMENTS

| | | | |
|---|---|---|---|
| 6,157,766 A | 12/2000 | Laniepce et al. |
| 6,160,946 A | 12/2000 | Thompson et al. |
| 6,167,183 A | 12/2000 | Swain |
| 6,181,845 B1 | 1/2001 | Horsthuis et al. |
| 6,185,348 B1 | 2/2001 | Shahid |
| 6,188,687 B1 | 2/2001 | Mussman et al. |
| 6,188,825 B1 | 2/2001 | Bandy et al. |
| 6,205,278 B1 | 3/2001 | Sjolinder |
| 6,208,779 B1 | 3/2001 | Rowlette, Sr. et al. |
| 6,208,796 B1 | 3/2001 | Williams Vigliaturo |
| 6,215,938 B1 | 4/2001 | Reitmeier et al. |
| 6,222,976 B1 | 4/2001 | Shahid |
| 6,224,269 B1 | 5/2001 | Engstrand et al. |
| 6,226,431 B1 | 5/2001 | Brown et al. |
| 6,227,717 B1 | 5/2001 | Ott et al. |
| 6,229,933 B1 | 5/2001 | Curzio et al. |
| 6,229,942 B1 | 5/2001 | Engberg et al. |
| 6,234,683 B1 | 5/2001 | Waldron et al. |
| 6,236,795 B1 | 5/2001 | Rodgers |
| 6,240,229 B1 | 5/2001 | Roth |
| 6,256,443 B1 | 7/2001 | Uruno et al. |
| 6,259,844 B1 | 7/2001 | Logan et al. |
| 6,269,214 B1 | 7/2001 | Naudin et al. |
| 6,271,484 B1 | 8/2001 | Tokutsu |
| 6,278,829 B1 | 8/2001 | BuAbbud et al. |
| 6,301,413 B1 | 10/2001 | Bringuier |
| 6,304,690 B1 | 10/2001 | Day |
| 6,317,533 B1 | 11/2001 | Slater et al. |
| RE37,489 E | 1/2002 | Anton et al. |
| 6,338,975 B1 | 1/2002 | Yoshimura et al. |
| 6,347,888 B1 | 2/2002 | Puetz |
| 6,351,590 B1 | 2/2002 | Shahid |
| 6,352,374 B1 | 3/2002 | Selfridge et al. |
| 6,356,690 B1 | 3/2002 | McAlpine et al. |
| 6,356,697 B1 | 3/2002 | Braga et al. |
| 6,360,050 B1 | 3/2002 | Moua et al. |
| 6,363,200 B1 | 3/2002 | Thompson et al. |
| 6,377,738 B1 | 4/2002 | Anderson et al. |
| 6,385,381 B1 | 5/2002 | Janus et al. |
| 6,411,767 B1 | 6/2002 | Burrous et al. |
| 6,419,399 B1 | 7/2002 | Loder et al. |
| 6,424,781 B1 | 7/2002 | Puetz et al. |
| 6,425,694 B1 | 7/2002 | Szilagyi et al. |
| 6,431,762 B1 | 8/2002 | Taira et al. |
| 6,434,313 B1 | 8/2002 | Clapp, Jr. et al. |
| 6,442,322 B1 | 8/2002 | Chen et al. |
| 6,442,323 B1 | 8/2002 | Sorosiak |
| 6,445,866 B1 | 9/2002 | Clairadin et al. |
| 6,452,925 B1 | 9/2002 | Sistanizadeh et al. |
| 6,453,033 B1 | 9/2002 | Little et al. |
| 6,464,402 B1 | 10/2002 | Andrews et al. |
| 6,464,404 B1 | 10/2002 | Robinson et al. |
| D466,087 S | 11/2002 | Cuny et al. |
| 6,480,487 B1 | 11/2002 | Wegleitner et al. |
| 6,480,661 B2 | 11/2002 | Kadar-Kallen et al. |
| 6,483,977 B2 | 11/2002 | Battey et al. |
| 6,493,480 B1 | 12/2002 | Lelic |
| 6,496,638 B1 | 12/2002 | Andersen |
| 6,496,640 B1 | 12/2002 | Harvey et al. |
| 6,504,988 B1 | 1/2003 | Trebesch et al. |
| 6,510,273 B2 | 1/2003 | Ali et al. |
| 6,526,210 B1 | 2/2003 | Harrison et al. |
| 6,532,332 B2 | 3/2003 | Solheid et al. |
| 6,535,682 B1 | 3/2003 | Puetz et al. |
| 6,537,106 B1 | 3/2003 | Follingstad |
| 6,539,147 B1 | 3/2003 | Mahony |
| 6,539,160 B2 | 3/2003 | Battey et al. |
| 6,542,688 B1 | 4/2003 | Battey et al. |
| 6,547,445 B2 | 4/2003 | Kiani |
| 6,547,450 B2 | 4/2003 | Lampert |
| 6,554,483 B1 | 4/2003 | Sun et al. |
| 6,554,485 B1 | 4/2003 | Beatty et al. |
| 6,556,763 B1 | 4/2003 | Puet et al. |
| 6,573,451 B2 | 6/2003 | Komiya et al. |
| 6,577,595 B1 | 6/2003 | Counterman |
| 6,591,051 B2 | 7/2003 | Solheid et al. |
| 6,594,434 B1 | 7/2003 | Davidson et al. |
| 6,594,436 B2 | 7/2003 | Sun et al. |
| 6,597,670 B1 | 7/2003 | Tweedy et al. |
| 6,600,860 B2 | 7/2003 | Sun et al. |
| 6,600,866 B2 | 7/2003 | Gatica et al. |
| 6,614,980 B1 | 9/2003 | Mahony |
| 6,619,853 B2 | 9/2003 | Grois et al. |
| 6,621,975 B2 | 9/2003 | Laporte et al. |
| 6,623,170 B2 | 9/2003 | Petrillo |
| 6,625,375 B1 | 9/2003 | Mahony |
| 6,628,866 B1 | 9/2003 | Wilson et al. |
| 6,631,237 B2 | 10/2003 | Knudsen et al. |
| RE38,311 E | 11/2003 | Wheeler |
| 6,648,376 B2 | 11/2003 | Christianson |
| 6,654,536 B2 | 11/2003 | Battey et al. |
| 6,661,961 B1 | 12/2003 | Allen et al. |
| 6,668,124 B2 | 12/2003 | Kondo et al. |
| 6,668,127 B1 | 12/2003 | Mahony |
| 6,688,780 B2 | 2/2004 | Duran |
| 6,690,862 B1 | 2/2004 | Rietveld |
| 6,690,867 B2 | 2/2004 | Melton et al. |
| 6,697,560 B1 | 2/2004 | Kondo et al. |
| 6,709,607 B2 | 3/2004 | Hibbs-Brenner et al. |
| 6,711,339 B2 | 3/2004 | Puetz et al. |
| 6,736,670 B2 | 5/2004 | Clark et al. |
| 6,755,574 B2 | 6/2004 | Fujiwara et al. |
| 6,760,530 B1 | 7/2004 | Mandry |
| 6,760,531 B1 | 7/2004 | Solheid et al. |
| 6,761,585 B2 | 7/2004 | Clark et al. |
| 6,763,166 B2 | 7/2004 | Yow, Jr. et al. |
| 6,764,221 B1 | 7/2004 | de Jong et al. |
| 6,768,860 B2 | 7/2004 | Liberty |
| 6,775,458 B2 | 8/2004 | Yow, Jr. et al. |
| 6,778,752 B2 | 8/2004 | Laporte et al. |
| 6,779,906 B1 | 8/2004 | Delmar |
| 6,788,786 B1 | 9/2004 | Kessler et al. |
| 6,788,846 B2 | 9/2004 | Hileman et al. |
| 6,792,190 B2 | 9/2004 | Xin et al. |
| 6,792,191 B1 | 9/2004 | Clapp, Jr. et al. |
| 6,793,399 B1 | 9/2004 | Nguyen |
| 6,793,517 B2 | 9/2004 | Neer et al. |
| 6,796,717 B2 | 9/2004 | Petrillo |
| 6,801,680 B2 | 10/2004 | Lin |
| 6,808,444 B1 | 10/2004 | Kuprin et al. |
| 6,810,193 B1 | 10/2004 | Muller |
| 6,815,612 B2 | 11/2004 | Bloodworth et al. |
| 6,819,821 B2 | 11/2004 | Lacey et al. |
| 6,843,606 B2 | 1/2005 | Deane et al. |
| 6,845,207 B2 | 1/2005 | Schray |
| 6,845,208 B2 | 1/2005 | Thibault et al. |
| 6,850,671 B2 | 2/2005 | Carnevale et al. |
| 6,850,685 B2 | 2/2005 | Tinucci et al. |
| 6,853,795 B2 | 2/2005 | Dagley et al. |
| 6,865,330 B2 | 3/2005 | Lecomte et al. |
| 6,870,734 B2 | 3/2005 | Mertesdorf et al. |
| 6,873,773 B2 | 3/2005 | Sun et al. |
| 6,888,069 B1 | 5/2005 | Chen et al. |
| 6,901,200 B2 | 5/2005 | Schray |
| 6,909,833 B2 | 6/2005 | Henschel et al. |
| 6,912,349 B2 | 6/2005 | Clark et al. |
| 6,916,199 B2 | 7/2005 | Follingstad |
| 6,920,213 B2 | 7/2005 | Pershan |
| 6,920,274 B2 | 7/2005 | Rapp et al. |
| 6,925,241 B2 | 8/2005 | Bohle et al. |
| 6,934,457 B2 | 8/2005 | Vincent et al. |
| 6,937,800 B2 | 8/2005 | Cote |
| 6,950,593 B2 | 9/2005 | Hodge et al. |
| 6,959,139 B2 | 10/2005 | Erwin et al. |
| 6,968,111 B2 | 11/2005 | Trebesch et al. |
| 6,980,725 B1 | 12/2005 | Swieconek |
| 6,983,095 B2 | 1/2006 | Reagan et al. |
| H2144 H | 2/2006 | Baechtle et al. |
| 7,006,748 B2 | 2/2006 | Dagley et al. |
| 7,018,113 B1 | 3/2006 | Wang et al. |
| 7,020,359 B2 | 3/2006 | Mayer |
| 7,029,322 B2 | 4/2006 | Ernst et al. |
| 7,058,245 B2 | 6/2006 | Farahi |
| 7,062,177 B1 | 6/2006 | Grivna et al. |

(56) References Cited

U.S. PATENT DOCUMENTS

| | | |
|---|---|---|
| 7,066,762 B2 | 6/2006 | Neer et al. |
| 7,066,771 B2 | 6/2006 | Clark et al. |
| 7,068,907 B2 | 6/2006 | Schray |
| 7,075,565 B1 | 7/2006 | Raymond et al. |
| 7,086,539 B2 | 8/2006 | Knudsen et al. |
| 7,088,899 B2 | 8/2006 | Reagan et al. |
| 7,090,084 B2 | 8/2006 | Knudsen et al. |
| 7,092,592 B2 | 8/2006 | Verhagen et al. |
| 7,094,095 B1 | 8/2006 | Caveney |
| 7,102,884 B2 | 9/2006 | Mertesdorf et al. |
| 7,103,255 B2 | 9/2006 | Reagan et al. |
| 7,113,686 B2 | 9/2006 | Bellekens et al. |
| 7,130,498 B2 | 10/2006 | Meis et al. |
| 7,139,456 B2 | 11/2006 | Sasaki et al. |
| 7,139,461 B2 | 11/2006 | Puetz et al. |
| 7,142,764 B2 | 11/2006 | Allen et al. |
| 7,142,765 B2 | 11/2006 | Rapp et al. |
| 7,146,089 B2 | 12/2006 | Reagan et al. |
| 7,149,398 B2 | 12/2006 | Solheid et al. |
| 7,171,102 B2 | 1/2007 | Reagan et al. |
| 7,179,119 B2 | 2/2007 | Follingstad |
| 7,186,032 B1 | 3/2007 | Stevens et al. |
| 7,194,181 B2 | 3/2007 | Holmberg et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,712 B2 | 6/2007 | Arellano |
| 7,233,731 B2 | 6/2007 | Solheid et al. |
| 7,241,182 B2 | 7/2007 | Clark et al. |
| 7,244,144 B2 | 7/2007 | Follingstad |
| 7,248,772 B2 | 7/2007 | Suzuki et al. |
| 7,277,620 B2 | 10/2007 | Vongseng et al. |
| 7,302,153 B2 | 11/2007 | Thom |
| 7,330,546 B2 | 2/2008 | Kessler et al. |
| 7,333,707 B2 | 2/2008 | Puetz et al. |
| 7,335,056 B1 | 2/2008 | Clark et al. |
| 7,346,254 B2 | 3/2008 | Kramer et al. |
| 7,352,921 B2 | 4/2008 | Saito et al. |
| 7,357,667 B2 | 4/2008 | Clark et al. |
| 7,367,823 B2 | 5/2008 | Rapp et al. |
| 7,369,741 B2 | 5/2008 | Reagan et al. |
| 7,376,321 B2 | 5/2008 | Bolster et al. |
| 7,376,322 B2 | 5/2008 | Zimmel et al. |
| 7,376,323 B2 | 5/2008 | Zimmel |
| 7,377,697 B2 | 5/2008 | Kahle et al. |
| 7,391,952 B1 | 6/2008 | Ugolini et al. |
| 7,400,813 B2 | 7/2008 | Zimmel |
| 7,400,816 B2 | 7/2008 | Reagan et al. |
| 7,406,240 B2 | 7/2008 | Murano |
| 7,407,330 B2 | 8/2008 | Smith et al. |
| 7,408,769 B2 | 8/2008 | Mertesdorf et al. |
| 7,412,147 B2 | 8/2008 | Scadden |
| 7,416,349 B2 | 8/2008 | Kramer |
| 7,418,181 B2 | 8/2008 | Zimmel et al. |
| 7,433,915 B2 | 10/2008 | Edwards et al. |
| 7,455,548 B2 | 11/2008 | Clark et al. |
| 7,457,503 B2 | 11/2008 | Solheid et al. |
| 7,460,757 B2 | 12/2008 | Hoehne et al. |
| 7,471,869 B2 | 12/2008 | Reagan et al. |
| 7,493,002 B2 | 2/2009 | Coburn et al. |
| 7,493,044 B2 | 2/2009 | Kozischek et al. |
| 7,496,268 B2 | 2/2009 | Escoto et al. |
| 7,515,805 B2 | 4/2009 | Vongseng et al. |
| 7,519,259 B2 | 4/2009 | Smith et al. |
| 7,532,782 B2 | 5/2009 | Bragg et al. |
| 7,534,135 B2 | 5/2009 | Follingstad |
| 7,543,993 B2 | 6/2009 | Blauvelt et al. |
| 7,544,090 B2 | 6/2009 | Follingstad |
| 7,553,091 B2 | 6/2009 | McColloch |
| 7,555,193 B2 | 6/2009 | Rapp et al. |
| 7,623,749 B2 | 11/2009 | Reagan et al. |
| 7,627,204 B1 | 12/2009 | Deane |
| 7,646,958 B1 | 1/2010 | Reagan et al. |
| 7,668,427 B2 | 2/2010 | Register |
| 7,686,658 B2 | 3/2010 | Clark et al. |
| 7,689,089 B2 | 3/2010 | Wagner et al. |
| 7,706,656 B2 | 4/2010 | Zimmel |
| 7,722,261 B2 | 5/2010 | Kadar-Kallen et al. |
| 7,738,755 B2 | 6/2010 | Shioda |
| 7,738,760 B2 | 6/2010 | Fredrickson et al. |
| 7,747,125 B1 | 6/2010 | Lee et al. |
| RE41,460 E | 7/2010 | Wheeler |
| 7,751,674 B2 | 7/2010 | Hill |
| 7,756,371 B1 | 7/2010 | Burnham et al. |
| 7,773,843 B2 | 8/2010 | Cody et al. |
| 7,775,725 B2 | 8/2010 | Grinderslev |
| 7,805,043 B2 | 9/2010 | Puetz et al. |
| 7,809,232 B2 | 10/2010 | Reagan et al. |
| 7,809,233 B2 | 10/2010 | Smith et al. |
| 7,809,234 B2 | 10/2010 | Smith et al. |
| 7,809,235 B2 | 10/2010 | Reagan et al. |
| 7,822,313 B2 | 10/2010 | Rapp et al. |
| 7,826,706 B2 | 11/2010 | Vongseng et al. |
| 7,841,775 B2 | 11/2010 | Smith et al. |
| 7,844,159 B2 | 11/2010 | Solheid et al. |
| 7,844,161 B2 | 11/2010 | Reagan et al. |
| 7,856,166 B2 | 12/2010 | Biribuze et al. |
| 7,873,255 B2 | 1/2011 | Reagan et al. |
| 7,889,961 B2 | 2/2011 | Cote et al. |
| 7,934,948 B2 | 5/2011 | Follingstad |
| 7,942,004 B2 | 5/2011 | Hodder |
| 7,945,138 B2 | 5/2011 | Hill et al. |
| 7,961,999 B2 | 6/2011 | Frohlich et al. |
| 7,983,521 B2 | 7/2011 | Rapp et al. |
| 8,019,192 B2 | 9/2011 | Puetz et al. |
| 8,032,032 B2 | 10/2011 | Chand et al. |
| 8,041,221 B2 | 10/2011 | Elberbaum |
| 8,059,932 B2 | 11/2011 | Hill et al. |
| 8,078,017 B2 | 12/2011 | Kodama et al. |
| 8,085,472 B2 | 12/2011 | Kadar-Kallen |
| 8,113,723 B2 | 2/2012 | Togami et al. |
| 8,139,913 B2 | 3/2012 | Bolster et al. |
| 8,184,938 B2 | 5/2012 | Cooke et al. |
| 8,195,022 B2 | 6/2012 | Coburn et al. |
| 8,280,205 B2 | 10/2012 | Erdman et al. |
| 8,280,216 B2 | 10/2012 | Cooke et al. |
| 8,292,518 B2 | 10/2012 | Togami et al. |
| 8,313,249 B2 | 11/2012 | Gurreri et al. |
| 8,342,755 B2 | 1/2013 | Nhep |
| 8,358,900 B2 | 1/2013 | Rapp et al. |
| 8,374,477 B2 | 2/2013 | Hill |
| 8,406,587 B2 | 3/2013 | Mudd et al. |
| 8,417,074 B2 | 4/2013 | Nhep et al. |
| 8,428,418 B2 | 4/2013 | Smrha |
| 8,457,458 B2 | 6/2013 | Kadar-Kallen et al. |
| 8,463,091 B2 | 6/2013 | Kewitsch |
| 8,466,848 B2 | 6/2013 | Guy et al. |
| 8,485,737 B2 | 7/2013 | Kolesar |
| 8,588,566 B2 | 11/2013 | Matsuyama et al. |
| 8,600,208 B2 | 12/2013 | Badar et al. |
| 8,649,648 B2 | 2/2014 | Coburn et al. |
| 8,690,593 B2 | 4/2014 | Anderson et al. |
| 8,693,836 B2 | 4/2014 | Kimbrell et al. |
| 8,712,206 B2 | 4/2014 | Cooke et al. |
| 8,886,335 B2 | 11/2014 | Pianca et al. |
| 9,011,020 B2 | 4/2015 | Ty Tan et al. |
| 9,031,360 B2 | 5/2015 | Schneider et al. |
| 9,075,216 B2 | 7/2015 | Cote et al. |
| 9,091,818 B2 | 7/2015 | Kadar-Kallen |
| 9,223,094 B2 | 12/2015 | Schneider et al. |
| 9,229,172 B2 | 1/2016 | Eberle, Jr. |
| 9,329,353 B2 | 5/2016 | Solheid et al. |
| 9,341,786 B1 | 5/2016 | Gamache et al. |
| 9,354,416 B2 | 5/2016 | Solheid et al. |
| 9,417,418 B2 | 8/2016 | Eberle, Jr. et al. |
| 9,488,788 B2 | 11/2016 | Murray et al. |
| 9,753,229 B2 | 9/2017 | Murray et al. |
| 9,874,711 B2 | 1/2018 | Schneider et al. |
| 9,897,767 B2 | 2/2018 | Murray et al. |
| 10,031,295 B2 | 7/2018 | Eberle, Jr. et al. |
| 10,067,295 B2 | 9/2018 | Eberle, Jr. |
| 10,149,619 B2 | 12/2018 | Ito et al. |
| 10,209,454 B2 | 2/2019 | Isenhour et al. |
| 10,295,761 B2 | 5/2019 | Murray et al. |

(56) References Cited

U.S. PATENT DOCUMENTS

| | | |
|---|---|---|
| 10,317,638 B2 | 6/2019 | Schneider et al. |
| 10,379,311 B1 | 8/2019 | Krywicki et al. |
| 10,451,809 B2 | 10/2019 | Eberle, Jr. et al. |
| 10,620,382 B2 | 4/2020 | Eberle, Jr. |
| 10,739,534 B2 | 8/2020 | Murray et al. |
| 10,754,096 B2 | 8/2020 | Murray et al. |
| 10,782,483 B2 | 9/2020 | Eberle, Jr. et al. |
| 10,955,633 B2 | 3/2021 | Schneider et al. |
| 11,036,012 B2 | 6/2021 | Murray et al. |
| 11,372,165 B2 | 6/2022 | Eberle, Jr. et al. |
| 11,409,068 B2 | 8/2022 | Marcouiller et al. |
| 2001/0009136 A1 | 7/2001 | Bryning et al. |
| 2001/0041025 A1 | 11/2001 | Farahi |
| 2002/0015563 A1 | 2/2002 | Murakami et al. |
| 2002/0034290 A1 | 3/2002 | Pershan |
| 2002/0090191 A1 | 7/2002 | Sorosiak |
| 2002/0097962 A1 | 7/2002 | Yoshimura et al. |
| 2002/0102088 A1 | 8/2002 | Kondo et al. |
| 2002/0131719 A1 | 9/2002 | Grois et al. |
| 2002/0150372 A1 | 10/2002 | Schray et al. |
| 2002/0174691 A1 | 11/2002 | Arishima et al. |
| 2002/0181893 A1 | 12/2002 | White et al. |
| 2002/0181922 A1 | 12/2002 | Xin et al. |
| 2002/0186954 A1 | 12/2002 | Liu et al. |
| 2003/0002812 A1 | 1/2003 | Lampert |
| 2003/0007742 A1 | 1/2003 | Kowatsch |
| 2003/0007767 A1 | 1/2003 | Douglas et al. |
| 2003/0031436 A1 | 2/2003 | Simmons et al. |
| 2003/0031452 A1 | 2/2003 | Simmons et al. |
| 2003/0042040 A1 | 3/2003 | Komiya et al. |
| 2003/0044141 A1 | 3/2003 | Melton et al. |
| 2003/0059526 A1 | 3/2003 | Benson et al. |
| 2003/0072535 A1 | 4/2003 | Sun et al. |
| 2003/0072537 A1 | 4/2003 | Eichenberger et al. |
| 2003/0095772 A1 | 5/2003 | Solheid et al. |
| 2003/0128951 A1 | 7/2003 | Lecomte et al. |
| 2003/0138187 A1 | 7/2003 | Kawase et al. |
| 2003/0142949 A1 | 7/2003 | Hicks et al. |
| 2003/0147597 A1 | 8/2003 | Duran |
| 2003/0165315 A1 | 9/2003 | Trebesch et al. |
| 2003/0169570 A1 | 9/2003 | Brebner et al. |
| 2003/0174953 A1 | 9/2003 | Carnevale et al. |
| 2003/0174996 A1 | 9/2003 | Henschel et al. |
| 2003/0180012 A1 | 9/2003 | Deane et al. |
| 2003/0182015 A1 | 9/2003 | Domaille et al. |
| 2003/0198427 A1 | 10/2003 | Bragg et al. |
| 2003/0223724 A1 | 12/2003 | Puetz et al. |
| 2004/0028368 A1 | 2/2004 | Hileman et al. |
| 2004/0033007 A1 | 2/2004 | Ohtsu et al. |
| 2004/0062488 A1 | 4/2004 | Wood |
| 2004/0074852 A1 | 4/2004 | Knudsen et al. |
| 2004/0109660 A1 | 6/2004 | Liberty |
| 2004/0114874 A1 | 6/2004 | Bono et al. |
| 2004/0126069 A1 | 7/2004 | Jong et al. |
| 2004/0136638 A1 | 7/2004 | Baechtle et al. |
| 2004/0161212 A1 | 8/2004 | Sun et al. |
| 2004/0165852 A1 | 8/2004 | Erwin et al. |
| 2004/0172492 A1 | 9/2004 | Farnworth et al. |
| 2004/0175090 A1 | 9/2004 | Vastmans et al. |
| 2004/0179771 A1 | 9/2004 | Verhagen et al. |
| 2004/0213505 A1 | 10/2004 | Saito et al. |
| 2004/0228598 A1 | 11/2004 | Allen et al. |
| 2004/0264873 A1 | 12/2004 | Smith et al. |
| 2005/0002633 A1 | 1/2005 | Solheid et al. |
| 2005/0003697 A1 | 1/2005 | Neer et al. |
| 2005/0018950 A1 | 1/2005 | Arellano |
| 2005/0023656 A1 | 2/2005 | Leedy |
| 2005/0048831 A1 | 3/2005 | Neer et al. |
| 2005/0053337 A1 | 3/2005 | Mayer |
| 2005/0084200 A1 | 4/2005 | Meis et al. |
| 2005/0111801 A1 | 5/2005 | Garman et al. |
| 2005/0123261 A1 | 6/2005 | Bellekens et al. |
| 2005/0129379 A1 | 6/2005 | Reagan et al. |
| 2005/0226566 A1 | 10/2005 | Sasaki et al. |
| 2006/0029353 A1 | 2/2006 | Bolster et al. |
| 2006/0088258 A1 | 4/2006 | Sasaki et al. |
| 2006/0093274 A1 | 5/2006 | Kahle et al. |
| 2006/0093301 A1 | 5/2006 | Zimmel et al. |
| 2006/0098914 A1 | 5/2006 | Tourne |
| 2006/0165366 A1 | 7/2006 | Feustel et al. |
| 2006/0177175 A1 | 8/2006 | Mayer et al. |
| 2006/0210222 A1 | 9/2006 | Watte et al. |
| 2006/0210229 A1 | 9/2006 | Scadden |
| 2006/0228086 A1 | 10/2006 | Holmberg et al. |
| 2006/0245756 A1 | 11/2006 | Kozischek et al. |
| 2006/0257657 A1 | 11/2006 | Curran et al. |
| 2006/0269205 A1 | 11/2006 | Zimmel |
| 2006/0269206 A1 | 11/2006 | Zimmel |
| 2007/0003204 A1 | 1/2007 | Makrides-Saravanos et al. |
| 2007/0025672 A1 | 2/2007 | Suzuki et al. |
| 2007/0025675 A1 | 2/2007 | Kramer |
| 2007/0047893 A1 | 3/2007 | Kramer et al. |
| 2007/0086694 A1 | 4/2007 | Murphy et al. |
| 2007/0189692 A1 | 8/2007 | Zimmel et al. |
| 2007/0206902 A1 | 9/2007 | Blauvelt et al. |
| 2007/0230863 A1 | 10/2007 | Fukuda et al. |
| 2007/0237449 A1 | 10/2007 | Aoki et al. |
| 2007/0239232 A1 | 10/2007 | Kurtz et al. |
| 2008/0008436 A1 | 1/2008 | Reagan et al. |
| 2008/0008437 A1 | 1/2008 | Reagan et al. |
| 2008/0017985 A1 | 1/2008 | Kilger |
| 2008/0019655 A1 | 1/2008 | Vongseng et al. |
| 2008/0025684 A1 | 1/2008 | Vongseng et al. |
| 2008/0089656 A1 | 4/2008 | Wagner et al. |
| 2008/0095501 A1 | 4/2008 | McColloch |
| 2008/0124038 A1 | 5/2008 | Kowalczyk et al. |
| 2008/0131067 A1 | 6/2008 | Ugolini et al. |
| 2008/0145011 A1 | 6/2008 | Register |
| 2008/0175548 A1 | 7/2008 | Knecht et al. |
| 2008/0175550 A1 | 7/2008 | Coburn et al. |
| 2008/0187276 A1 | 8/2008 | Roberts et al. |
| 2008/0273846 A1 | 11/2008 | Register |
| 2008/0298748 A1 | 12/2008 | Cox et al. |
| 2008/0310854 A1 | 12/2008 | Takai et al. |
| 2008/0317425 A1 | 12/2008 | Smith et al. |
| 2009/0041417 A1 | 2/2009 | Rapp et al. |
| 2009/0067800 A1 | 3/2009 | Vazquez et al. |
| 2009/0067802 A1 | 3/2009 | Hoehne et al. |
| 2009/0074372 A1 | 3/2009 | Solheid et al. |
| 2009/0087157 A1 | 4/2009 | Smith et al. |
| 2009/0097797 A1 | 4/2009 | Kewitsch |
| 2009/0097800 A1 | 4/2009 | Gurreri et al. |
| 2009/0097813 A1 | 4/2009 | Hill |
| 2009/0134318 A1 | 5/2009 | Kuniyoshi et al. |
| 2009/0142026 A1 | 6/2009 | Shioda |
| 2009/0180737 A1 | 7/2009 | Burnham et al. |
| 2009/0190896 A1 | 7/2009 | Smith et al. |
| 2009/0196563 A1 | 8/2009 | Mullsteff et al. |
| 2009/0196565 A1 | 8/2009 | Vongseng et al. |
| 2009/0245743 A1 | 10/2009 | Cote et al. |
| 2009/0257726 A1 | 10/2009 | Redmann et al. |
| 2009/0269018 A1 | 10/2009 | Frohlich et al. |
| 2009/0274431 A1 | 11/2009 | Krampotich et al. |
| 2009/0285540 A1 | 11/2009 | Reagan et al. |
| 2009/0290843 A1 | 11/2009 | Reagan et al. |
| 2009/0297111 A1 | 12/2009 | Reagan et al. |
| 2009/0324189 A1 | 12/2009 | Hill et al. |
| 2010/0054683 A1 | 3/2010 | Cooke et al. |
| 2010/0086260 A1 | 4/2010 | Parikh et al. |
| 2010/0124421 A1 | 5/2010 | Chand et al. |
| 2010/0129028 A1 | 5/2010 | Nhep et al. |
| 2010/0142910 A1 | 6/2010 | Hill et al. |
| 2010/0158465 A1 | 6/2010 | Smrha |
| 2010/0166370 A1 | 7/2010 | Cody et al. |
| 2010/0195955 A1 | 8/2010 | Burnham et al. |
| 2010/0238428 A1 | 9/2010 | Glines et al. |
| 2010/0296790 A1 | 11/2010 | Cooke et al. |
| 2010/0298895 A1 | 11/2010 | Ghaffari et al. |
| 2010/0316334 A1 | 12/2010 | Kewitsch |
| 2010/0316335 A1 | 12/2010 | Furuyama |
| 2010/0322562 A1 | 12/2010 | Barnes et al. |
| 2010/0322576 A1 | 12/2010 | Rhoney et al. |
| 2010/0322577 A1 | 12/2010 | Bolster et al. |
| 2010/0322579 A1 | 12/2010 | Cooke et al. |

(56) References Cited

U.S. PATENT DOCUMENTS

| | | |
|---|---|---|
| 2010/0329620 A1 | 12/2010 | Griffiths et al. |
| 2011/0002586 A1 | 1/2011 | Nhep |
| 2011/0019964 A1 | 1/2011 | Nhep et al. |
| 2011/0034912 A1 | 2/2011 | de Graff et al. |
| 2011/0044599 A1 | 2/2011 | Kowalczyk et al. |
| 2011/0065909 A1 | 3/2011 | Lange et al. |
| 2011/0081114 A1 | 4/2011 | Togami et al. |
| 2011/0085764 A1 | 4/2011 | Greub et al. |
| 2011/0085771 A1 | 4/2011 | Matsuyama et al. |
| 2011/0096404 A1 | 4/2011 | Kadar-Kallen |
| 2011/0103748 A1 | 5/2011 | Ott |
| 2011/0103803 A1 | 5/2011 | Kolesar |
| 2011/0110673 A1 | 5/2011 | Elberbaum |
| 2011/0182558 A1 | 7/2011 | Garcia et al. |
| 2011/0217016 A1 | 9/2011 | Mullsteff |
| 2011/0222823 A1 | 9/2011 | Pitwon |
| 2011/0222829 A1 | 9/2011 | Loeffelholz et al. |
| 2011/0262077 A1 | 10/2011 | Anderson et al. |
| 2011/0268404 A1 | 11/2011 | Cote et al. |
| 2011/0268408 A1 | 11/2011 | Giraud et al. |
| 2011/0268410 A1 | 11/2011 | Giraud et al. |
| 2011/0268412 A1 | 11/2011 | Giraud et al. |
| 2011/0268414 A1 | 11/2011 | Giraud et al. |
| 2011/0274400 A1 | 11/2011 | Mudd et al. |
| 2011/0317973 A1 | 12/2011 | Rapp et al. |
| 2012/0002934 A1 | 1/2012 | Kimbrell et al. |
| 2012/0008900 A1 | 1/2012 | Schneider |
| 2012/0014645 A1 | 1/2012 | Kadar-Kallen |
| 2012/0020618 A1 | 1/2012 | Erdman et al. |
| 2012/0020619 A1 | 1/2012 | Kadar-Kallen et al. |
| 2012/0051706 A1 | 3/2012 | van Geffen et al. |
| 2012/0051708 A1 | 3/2012 | Badar et al. |
| 2012/0057838 A1 | 3/2012 | Hill et al. |
| 2012/0148198 A1 | 6/2012 | Togami et al. |
| 2012/0189259 A1 | 7/2012 | Manes |
| 2012/0213469 A1 | 8/2012 | Jia et al. |
| 2012/0263415 A1 | 10/2012 | Tan et al. |
| 2012/0276549 A1 | 11/2012 | Cunningham et al. |
| 2012/0288233 A1 | 11/2012 | Barnes et al. |
| 2012/0301098 A1 | 11/2012 | Benedetto et al. |
| 2012/0309080 A1 | 12/2012 | Cunningham et al. |
| 2013/0014936 A1 | 1/2013 | Griffith |
| 2013/0039616 A1 | 2/2013 | Shambat et al. |
| 2013/0064495 A1 | 3/2013 | Eberle, Jr. |
| 2013/0064506 A1 | 3/2013 | Eberle, Jr. et al. |
| 2013/0077913 A1 | 3/2013 | Schneider et al. |
| 2013/0089292 A1 | 4/2013 | Ott et al. |
| 2013/0148926 A1 | 6/2013 | Koshinz et al. |
| 2013/0148936 A1 | 6/2013 | Hill |
| 2013/0170797 A1 | 7/2013 | Ott |
| 2013/0287356 A1 | 10/2013 | Solheid et al. |
| 2013/0343700 A1 | 12/2013 | Kolesar |
| 2014/0086545 A1 | 3/2014 | Solheid et al. |
| 2014/0133810 A1 | 5/2014 | Schneider et al. |
| 2014/0205244 A1 | 7/2014 | Bradley |
| 2014/0212095 A1 | 7/2014 | Isenhour et al. |
| 2014/0270636 A1 | 9/2014 | Manes |
| 2014/0303452 A1 | 10/2014 | Ghaffari |
| 2015/0253514 A1 | 9/2015 | Murray et al. |
| 2015/0260927 A1 | 9/2015 | Murray et al. |
| 2016/0259141 A1 | 9/2016 | Schneider et al. |
| 2017/0153399 A1 | 6/2017 | Rodriguez |
| 2019/0025521 A1 | 1/2019 | Geens et al. |
| 2020/0348471 A1 | 11/2020 | Murray et al. |
| 2020/0386949 A1 | 12/2020 | Eberle, Jr. |
| 2021/0011228 A1 | 1/2021 | Murray et al. |
| 2021/0072463 A1 | 3/2021 | Zitsch et al. |
| 2021/0263252 A1 | 8/2021 | Schneider et al. |
| 2021/0302669 A1 | 9/2021 | Murray et al. |

FOREIGN PATENT DOCUMENTS

| | | |
|---|---|---|
| CN | 1248329 A | 1/1998 |
| CN | 2426610 Y | 4/2001 |
| CN | 1277137 C | 9/2006 |
| CN | 102057306 A | 5/2011 |
| CN | 102272650 A | 12/2011 |
| CN | 104335091 A | 2/2015 |
| CN | 104823091 A | 8/2015 |
| DE | 27 35 106 A1 | 2/1979 |
| DE | 33 08 682 A1 | 9/1984 |
| DE | 42 07 531 A1 | 9/1992 |
| DE | 42 29 510 A1 | 3/1994 |
| EP | 0 146 478 A2 | 6/1985 |
| EP | 0 149 250 A2 | 7/1985 |
| EP | 0 196 102 A2 | 10/1986 |
| EP | 0 211 208 A1 | 2/1987 |
| EP | 0 293 183 A2 | 11/1988 |
| EP | 0 349 290 A1 | 1/1990 |
| EP | 0 406 151 A2 | 1/1991 |
| EP | 0 479 226 A1 | 4/1992 |
| EP | 0 196 102 B1 | 3/1993 |
| EP | 0 538 164 A1 | 4/1993 |
| EP | 0 585 809 A1 | 3/1994 |
| EP | 0 587 336 A2 | 3/1994 |
| EP | 0 697 610 A1 | 2/1996 |
| EP | 0 743 701 A1 | 11/1996 |
| EP | 0 788 002 A1 | 8/1997 |
| EP | 0 871 047 A1 | 10/1998 |
| EP | 0 563 995 B1 | 10/1999 |
| EP | 0 975 180 A1 | 1/2000 |
| EP | 1 045 267 A1 | 10/2000 |
| EP | 1 067 418 A1 | 1/2001 |
| EP | 1 102 095 A1 | 5/2001 |
| EP | 1 103 832 A2 | 5/2001 |
| EP | 1 162 487 A2 | 12/2001 |
| EP | 1 884 809 A1 | 2/2008 |
| FR | 2 531 576 A1 | 2/1984 |
| FR | 2 587 127 A1 | 3/1987 |
| GB | 2 239 104 A | 6/1991 |
| GB | 2 367 902 A | 4/2002 |
| JP | 59-74523 A | 4/1984 |
| JP | 60-169811 A | 9/1985 |
| JP | 61-53076 A | 3/1986 |
| JP | 61-55607 A | 3/1986 |
| JP | 61-90104 A | 5/1986 |
| JP | 63-229409 A | 9/1988 |
| JP | H06-186438 A | 7/1994 |
| JP | H07-209526 A | 8/1995 |
| JP | H07-281052 A | 10/1995 |
| JP | H08-286081 A | 11/1996 |
| JP | H09-90171 A | 4/1997 |
| JP | H10-10368 A | 1/1998 |
| JP | H10-68853 A | 3/1998 |
| JP | H10-339818 A | 12/1998 |
| JP | 2001-255421 A | 9/2001 |
| JP | 2002-174736 A | 6/2002 |
| JP | 1144266 S | 6/2002 |
| JP | 2002-211945 A | 7/2002 |
| JP | 3307618 B2 | 7/2002 |
| JP | 2002-253341 A | 9/2002 |
| JP | 2002-254306 | 9/2002 |
| JP | 2002-311252 A | 10/2002 |
| JP | 2004-109237 A | 4/2004 |
| JP | 2005-257887 A | 9/2005 |
| JP | 3761762 B2 | 3/2006 |
| JP | 2007-233144 A | 9/2007 |
| JP | 2007-318741 A | 12/2007 |
| JP | 2010-19895 | 1/2010 |
| JP | 2010-239535 A | 10/2010 |
| JP | 4749566 B2 | 5/2011 |
| JP | 2011-191333 A | 9/2011 |
| JP | 4851430 B2 | 1/2012 |
| JP | 4911130 B2 | 1/2012 |
| KR | 10-2005-0034103 | 4/2005 |
| WO | 90/09708 A1 | 8/1990 |
| WO | 91/10927 A1 | 7/1991 |
| WO | 94/17534 A1 | 8/1994 |
| WO | 95/20175 A1 | 7/1995 |
| WO | 98/36309 A1 | 8/1998 |
| WO | 98/53347 A2 | 11/1998 |
| WO | 99/13367 A2 | 3/1999 |
| WO | 99/27404 A1 | 6/1999 |
| WO | 99/46621 A1 | 9/1999 |

(56) References Cited

FOREIGN PATENT DOCUMENTS

| WO | 00/05611 | A2 | 2/2000 |
|---|---|---|---|
| WO | 00/07053 | A2 | 2/2000 |
| WO | 00/52504 | A2 | 9/2000 |
| WO | 03/093883 | A2 | 11/2000 |
| WO | 00/75706 | A2 | 12/2000 |
| WO | 01/61317 | A1 | 8/2001 |
| WO | 01/75495 | A2 | 10/2001 |
| WO | 02/21182 | A1 | 3/2002 |
| WO | 02/103429 | A2 | 12/2002 |
| WO | 03/021312 | A1 | 3/2003 |
| WO | 2008/027201 | A2 | 3/2008 |
| WO | 2008/089192 | A1 | 7/2008 |
| WO | 2009/120280 | A2 | 10/2009 |
| WO | 2011/094327 | A1 | 8/2011 |
| WO | 2011/100613 | A1 | 8/2011 |
| WO | 2013/106820 | A1 | 7/2013 |
| WO | 2017/121778 | A1 | 7/2017 |

OTHER PUBLICATIONS

ADC Telecommunications brochure entitled "Fiber Cable Management Products, Second Edition," 144 pages, dated Oct. 1995.
ADC Telecommunications, Inc. brochure entitled "FL2000 Products," Publication No. 803, 51 pages (Nov. 1996).
ADC Telecommunications brochure entitled "Next Generation Frame (NGF) Product Family Ordering Guide," 22 pages, dated Oct. 1998.
ADC Telecommunications, Inc., brochure entitled "Value-Added Module (VAM) System: Monitor, Splitter, WDM and CWDM Modules and Chassis for Switching Office, Central Exchange and Headend Applications, 1st edition," Part No. 101663BE, 36 pages (Feb. 2008).
ADC Telecommunications, Inc., "Value-Added Module (VAM) System—Monitor, Splitter, WDM/CWDM/DWDM Modules and Chassis—5th Edition," Oct. 2009, 32 Pages.
ADC Telecommunications, Inc., 600 mm Products, Value-Added Module System, pp. 53-78 (Oct. 2003).
ADC Telecommunications, Inc., brochure entitled "Value-Added Module System," Publication No. 891, 29 pages (Apr. 2000).
ADC Telecommunications, Inc., brochure entitled "Value-Added Module System: Optical Distribution Frame (OMX™ 300)," Publication No. 891-OMX, 11 pages (Jan. 2002).
ADC Telecommunications, Inc., brochure entitled "Fiber Management Tray: 2 Rack Unit (2 RU) Style FMT-G Series," Publication No. 1258896, 8 pages (Mar. 2003).
ADC Telecommunications, Inc., FMT Micro Value Added Monitor Module Configuration Scheme, pp. 1-2 (Feb. 6, 2003).
ADC Telecommunications, Inc., Mini VAM Connector Cleaning Instructions, ADCP-90-412, Issue 3, pp. 1-8 (Sep. 2002).
ADC Telecommunications, Inc., Mini VAM Splitter Mod (Installation Drawing), Drawing No. 1128185, 2 pages (Mar. 14, 2001).
ADC Telecommunications, Inc., Next Generation Frame (NGF) Product Tour, Value Added Modules (VAMs), Copyright 2003, 1 page, (admitted as offered for sale as of Apr. 25, 2006).
ADC Telecommunications, Inc., brochure entitled "Fiber Panel Products, Second Edition," front cover, Table of Contents, and pp. 1-111, Publication No. 846 (Jul. 1996) (116 pages total).
ADC Telecommunications, Inc.'s 6th Edition of Next Generation Frame (NGF) Product Family Ordering Guide; front cover, Table of Contents, pp. 1-41, and back cover; Item No. 820 (revised Feb. 2003) (44 pages total).
ADC Telecommunications, Inc.'s Fiber Optic, Cable Assemblies and Accessories Brochure; front cover, Table of Contents, pp. 1-23, and back cover; Item No. 100300 (revised Apr. 2003).
ADC Telecommunications, Inc., Next Generation Frame (NGF) Product Family, Publication No. 832, 8 pages, (Dec. 2000).
ADC Telecommunications, Inc., brochure entitled "Secure Fiber Entrance Terminal (SFET)," front cover, pp. 2-7, and back cover, Item No. 1005 (revised May 1998) (8 pages total).
ADC Telecommunications, Inc., brochure entitled "Outside Plant, Fiber Cross-Connect Solutions," front cover, Table of Contents, pp. 1-48, and back cover, Item No. 1047 (Jun. 2002).
Alcoa Fujikura Ltd., brochure entitled "Couplers: Couplers WDMS Packaging,", 5 pages (copyright 2000).
AMP Inc. catalog entitled "Fiber Optic Products,"front and back covers and p. 59, (4 pgs.) (© 1991).
Assembly reference drawings having drawing No. 1067101, dated Aug. 17, 1999 (8 pages).
AT&T Network Systems catalog entitled "Fiber Optic Products Innovation for wide ranging applications," front and back covers and pp. 6-1 through 6-16 (18 pages total) (© 1995).
AT&T Network Systems, Product Bulletin, "High Density Interconnect System (HDIC)," 2987D-DLH-7/89, Issue 2, 4 pages (Copyright 1989).
ATI Optique Catalog, ATI Optique Division of TI electronique, Version 2.6, released Mar. 27, 2002 (50 pages).
Amphenol Corp., brochure entitled "Amphenol® 954 Series one piece SC Connector," F122-00311, Issue 1, 2 pages (Aug. 1990).
21 photographs showing what AFL Telecommunications LLC purports to be the ECOE cabinet referenced in the Prior art statement and the Supplemental prior art statement listed above. AFL Telecommunications LLC asserts the cabinet was on sale as early as 2001.
24 photos of LambdaUnite® Blank Card; "LambdaUnite® MultiService Switch (MSS)" brochure (2003); and "Lucent's LambdaUnite® Busts Out" official release (Jan. 29, 2002) (33 pages total).
Bockstaele et al., "A scalable parallel optical interconnect family," IO Overview Paper, Apr. 2004 (10 pages).
First Office Action for Chinese Patent Application No. 201880064427.4 dated Mar. 2, 2021, 9 pages.
Connectorized splitter drawings having drawing No. 1067961, dated Aug. 18, 1999 (2 pages).
Corning Cable Systems, "Installation Instructions for 12-position Splice Protector Insert," SRP-001276, Issue 4, 1 page (Jul. 2001).
Corning Cable Systems, "Jumper Routing Procedure for Enhanced Management Frame," SRP-003599, Issue 2, 4 pages (Apr. 2002).
Extended European Search Report for Application No. 18864713.5 dated May 19, 2021.
Fiber distribution drawings having drawing No. 1069967, dated Aug. 17, 1999 (2 pages).
FONS Corporation, MDC Series Rack or Wall Mount Enclosures product sheet, 3 pages (2002).
FONS Corporation, Modular Distribution Cabinets Rack Mount Enclosures, Model MDC-7, product sheet, 2 pages (2005).
FONS Corporation's Technical Drawing No. 11669, Rev. D, of Distribution Cabinet Assembly MFDC-7, 1 page (technical drawing depicting the device shown in Exhibit M).
Grimes, "Applications of Parallel Optical Interconnects," Lasers and Electro-Optics Society Annual Meeting, Nov. 18-21, 1996, pp. 6-7, vol. 2 (2 pages).
Hasegawa et al., "100GHz-48CH Athermal AWG with a Novel Temperature Insensitive Principle," National Fiber Optics Engineers Conference, 2003 Technical Proceedings, pp. 801-808.
"High-density FlexPlane™ Optical Circuitry provides high-density optical routing on PCBs or backplanes", Molex, 3 pages (2012).
Hirose Electric Co., Ltd., catalog entitled "Optical Fibre Connectors," Catalog No. O.F. (9) 3K, front and back covers and pp. 16, 17 and 49 (Mar. 1991) (5 pages total).
http://www.youtube.com/watch?v=dNLFeCsa69E ; LK Flexible film Screen Protector Installation Video; May 8, 2017.
International Search Report and Written Opinion of the International Searching Authority for International Patent Application No. PCT/US2018/053935 dated Mar. 29, 2019, 11 pages.
International Standard, "Fiber optic connector interfaces—Part 4-1: Type SC connector family—Simplified receptacle SC-PC connecter interfaces," Copyright IEC 61754-4-1, First edition, Jan. 2003 (9 pages).
Installation drawings having drawing No. 1069965, dated Aug. 14, 1999 (3 pages).
Iwano, S. et al., "MU-type Optical Fiber Connector System," NTT Review, vol. 9, No. 2, pp. 63-71 (Mar. 1997).

(56) References Cited

OTHER PUBLICATIONS

Nexans, "Cross-Connect Cabinet III: Plastic Watertight Cabinet for FTTH Applications," 2 pages (Oct. 2002).
Nexans, "Cross-Connect Cabinet V: Metallic Watertight Cabinet for FTTH Applications," 2 pages (Oct. 2002).
Northern Telecom Bulletin #91-004, Issue #2, 16 pages (May 1991).
NTT International, brochure entitled "Fiber Termination Module (FTM) & Premises Optical Distribution Cabinets (PODC)," 3 pages, undated.
"OMX™ 600 Optical Distribution Frame," ADC Telecommunications, Inc., Publication No. 854, front cover, table of contents, pp. 1-13, rear cover (Apr. 2000).
"Optical fiber coupler review," Manufacturing Group at the Optoelectronics Division, Technical Report 2001, Products Presentation, showing Sumitomo Osaka Cement Co. Ltd's Optical Coupler (pp. 41-42).
Precision Mechanical, in Chinese with English Translation, 5 pages (publicly known at least as early as Aug. 2002).
Preface to the book "Structure, Installation, Connection and Protection of Communication Optical Fiber Cable," in Chinese with English Translation, 14 pages (Mar. 1992).
Schneider et al., "Fibre Optic Circuits," TechCon 2011 (10 pages).
Shahid, M.A. et al., "Flexible Optical Backplane Interconnections," Proceedings of MPPOI'96, pp. 178-185 (1996).
Shahid et al., "Flexible High Density Optical Circuits," National Fiber Optic Engineers Conference, 2001 Technical Proceedings (8 pages).
Sugita et al., "Sc-Type Single-Mode Optical Fiber Connectors," Journal of Lightwave Technology, vol. 7, No. 11, pp. 1689-1696 (Nov. 1989).
Tachikura et al., Newly Developed Optical Fiber Distribution System and Cable Management in Central Office, International Wire & Cable Symposium, Proceedings of the 50th IWCS, pp. 98-105.
U.S. Appl. No. 61/538,737, filed Sep. 23, 2011, entitled "Flexible Optical Circuit" (13 pages).
U.S. Appl. No. 61/707,323, filed Sep. 28, 2012 entitled "Fiber Optic Cassette."
U.S. Appl. No. 62/027,657, filed Jul. 22, 2014 entitled "Door Hinge Mechanism for Telecommunications Panel."

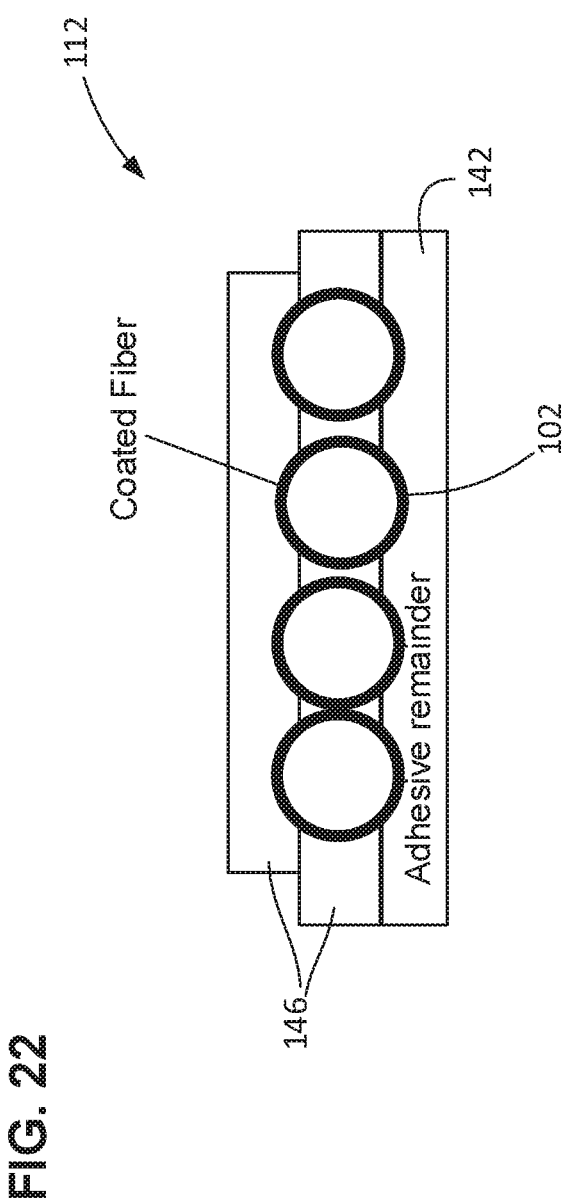

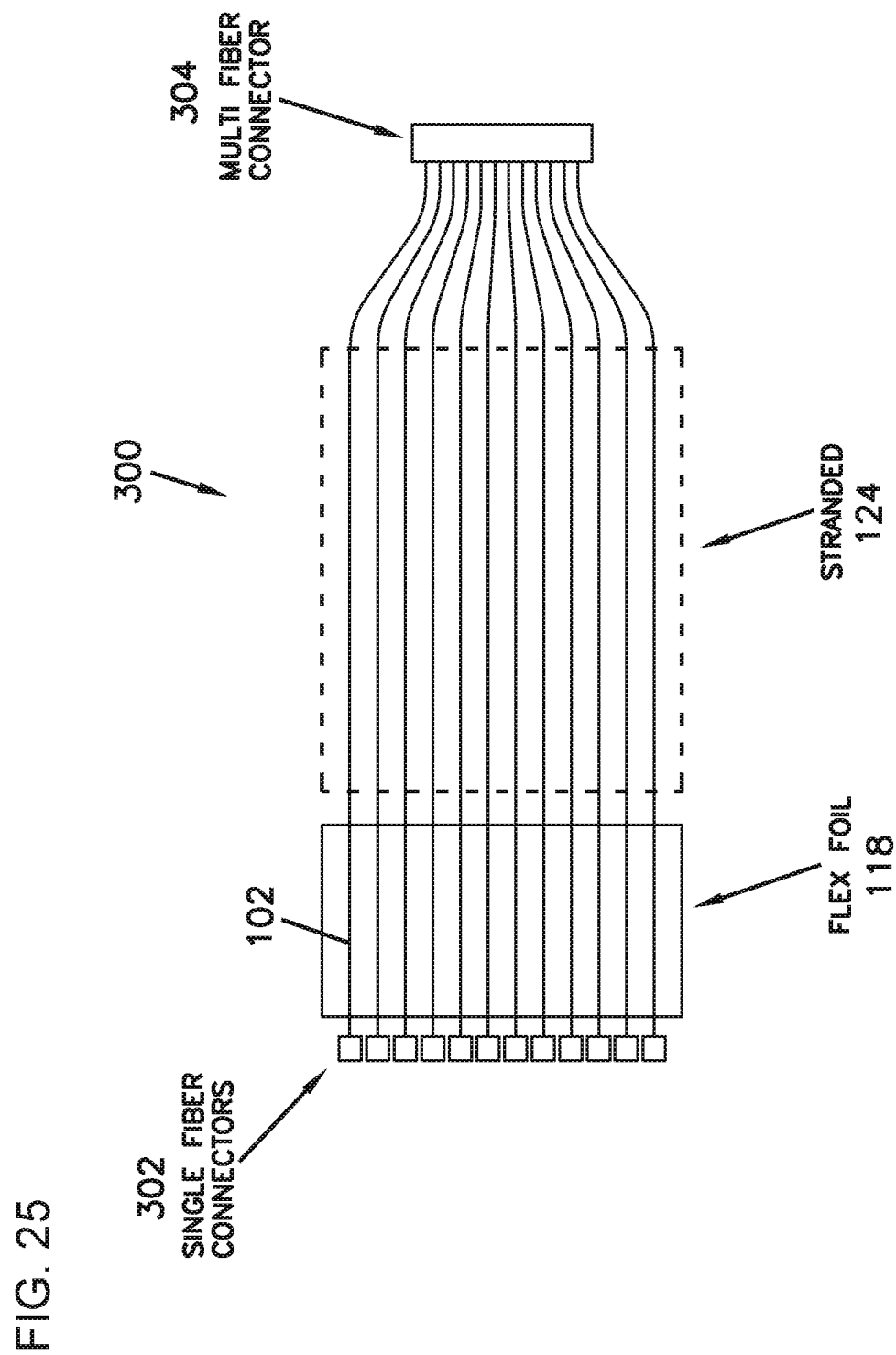

FIBER OPTIC CIRCUIT AND PREPARATION METHOD

CROSS-REFERENCE TO RELATED APPLICATION

This application is a Continuation of U.S. patent application Ser. No. 16/753,268, filed on Apr. 2, 2020, now U.S. Pat. No. 11,409,068; which is a National Stage Application of PCT/US2018/053935, filed on Oct. 2, 2018 which claims the benefit of U.S. Patent Application Ser. No. 62/566,906, filed on Oct. 2, 2017, the disclosures of which are incorporated herein by reference in their entireties. To the extent appropriate, a claim of priority is made to each of the above disclosed applications.

BACKGROUND

As demand for telecommunications increases, fiber optic networks are being extended in more and more areas. In dense environments, ease of installation, accessibility, and serviceability of the optical fibers within the equipment are important concerns. As a result, there is a need for fiber optic devices which address these and other concerns.

SUMMARY

An aspect of the present disclosure relates to fiber optic circuits, specifically, preformed optical circuits, wherein the fibers are disposed in a predetermined orientation/layout ready for termination to fiber optic connectors. Such fiber optic circuits may be carried within devices, for example, in the form of fiber optic cassettes. Such cassettes may house at least one connector terminated to the preformed circuit that provides a signal entry location and at least one connector terminated to an opposite end of the preformed circuit that provides a signal exit location, wherein the fiber optic circuit is positioned within an interior of the cassette for relaying the signal from the entry location to the exit location. The optical circuits of the present disclosure, as well as the equipment the circuits are housed in, can have many forms. A cassette is simply one example piece of fiber optic equipment for housing such preformed optical circuits.

Another aspect of the present disclosure relates to a method of preparing a preformed fiber optic circuit, the method comprising providing a substrate for supporting a plurality of optical fibers, the substrate including at least one layer of flexible foil and peeling a layer including at least the optical fibers from the at least one layer of flexible foil.

According to another aspect of the disclosure, the preformed fiber optic circuit that is configured for termination to at least one fiber optic connector can include a plurality of optical fibers arranged in a predetermined arrangement, wherein at least a portion of the optical fibers are supported by a layer of flexible foil and at least a portion are coated by a coating including silicone.

According to another aspect of the disclosure, the preformed fiber optic circuit that is configured for termination to at least one fiber optic connector can include a plurality of optical fibers arranged in a predetermined arrangement, wherein at least portion of the optical fibers are supported by a layer of flexible foil, wherein the portion supported by the layer of flexible foil is at least partially coated by a coating including silicone, wherein the plurality of optical fibers also includes at least a portion not supported by a layer of flexible foil and not coated by a coating including silicone.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 22 illustrates at least a portion of the preformed fiber optic circuit prepared in accordance with the method illustrated in FIGS. 13-20, wherein the portion includes a plurality of fibers in a predetermined arrangement coated by a silicone coating.

FIG. 25 illustrates a hybrid type fiber optic circuit prepared in accordance with the method illustrated in FIGS. 13-20, wherein first ends of the fibers of the circuit are terminated to simplex fiber optic connectors and second ends of the fibers of the circuit are terminated to a multi-fiber connector, wherein the portion of the fiber optic circuit adjacent the simplex fiber optic connectors includes a plurality of fibers in a predetermined arrangement supported a layer of PET foil and coated by a silicone coating, and wherein the portion of the fiber optic circuit adjacent the multi-fiber connector includes a plurality of uncoated bare stranded fibers in a predetermined arrangement.

DETAILED DESCRIPTION

The present disclosure is directed generally to fiber optic circuits, specifically, preformed optical circuits, wherein the fibers are disposed in a predetermined orientation/layout ready for termination to fiber optic connectors. Such fiber optic circuits may be carried within devices, for example, in the form of fiber optic cassettes that include at least one connector that provides a signal entry location and at least one connector that provides a signal exit location, wherein the fiber optic circuit is positioned thereinbetween for relaying the signal from the entry location to the exit location.

The use of preformed circuits in accordance with the present disclosure can provide a number of advantages. For example, the use of a preformed circuit allows a designer or technician to fix the fibers in a given orientation, wherein the circuit layouts may be produced in a predictable and automated manner. Manual handling and positioning of the fibers within the equipment may be reduced and eliminated through the use of preformed optical circuits. Complexity of the circuits can be increased due to the pre-fixed positioning of the fibers. Termination of the fibers may be facilitated. Methods of the present disclosure that are used to pre-fix the fibers allow the designers to optimize fiber bend radius limits and requirements in configuring the equipment in which they are used, thus, achieving reduced dimensions for the equipment. The bend radius of the fibers can thus be controlled to a minimum diameter.

It should be noted that the optical circuits of the present disclosure, as well as the equipment the circuits are housed in, can have many forms. A cassette is simply one example piece of fiber optic equipment for housing such preformed optical circuits.

Figure 1:
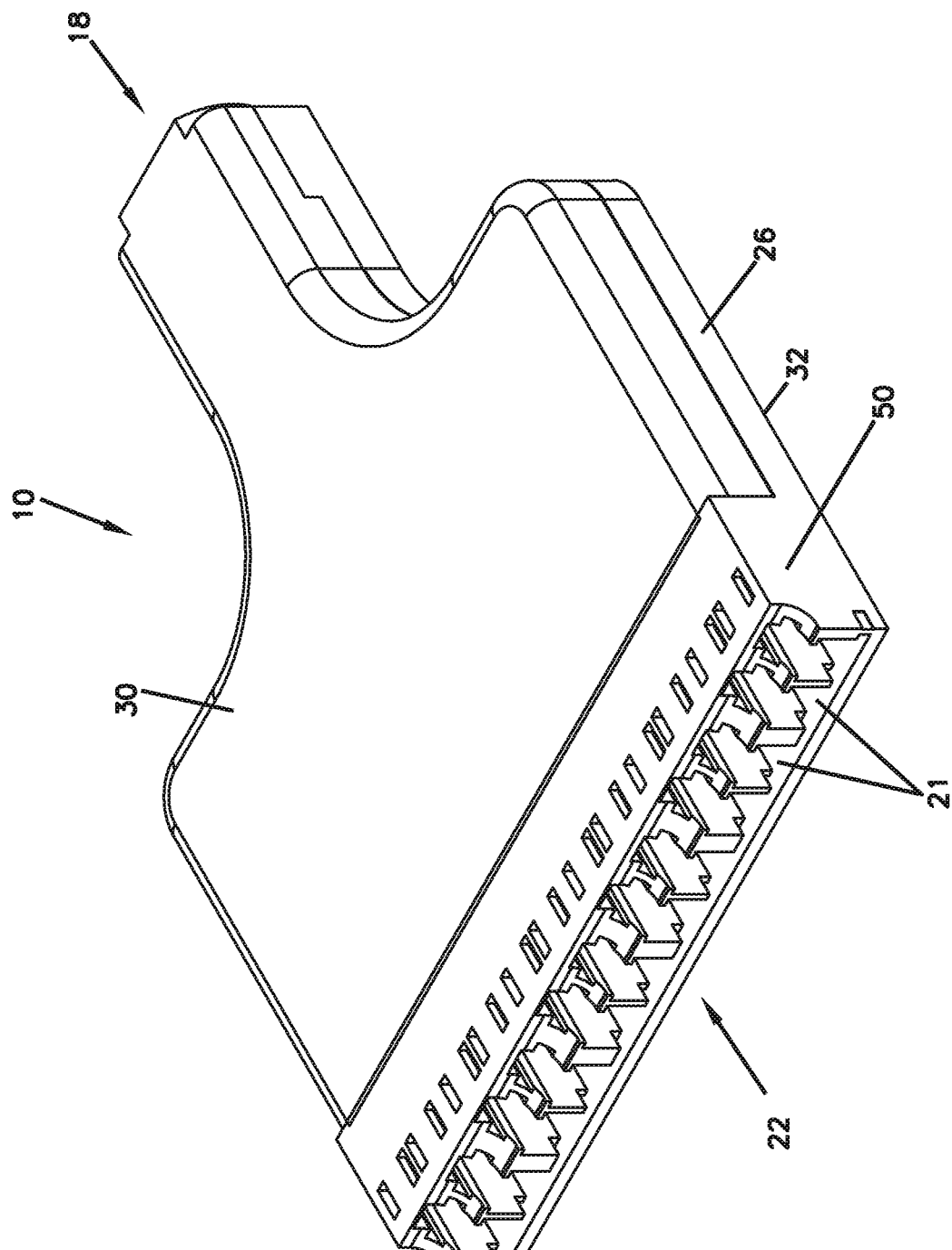
FIG. 1 is a top, front, right side perspective view of an example fiber optic cassette that is shown to house a flexible fiber optic circuit, the fiber optic cassette also being usable with the inventive preformed fiber optic circuits of the present disclosure.
Figure 2:
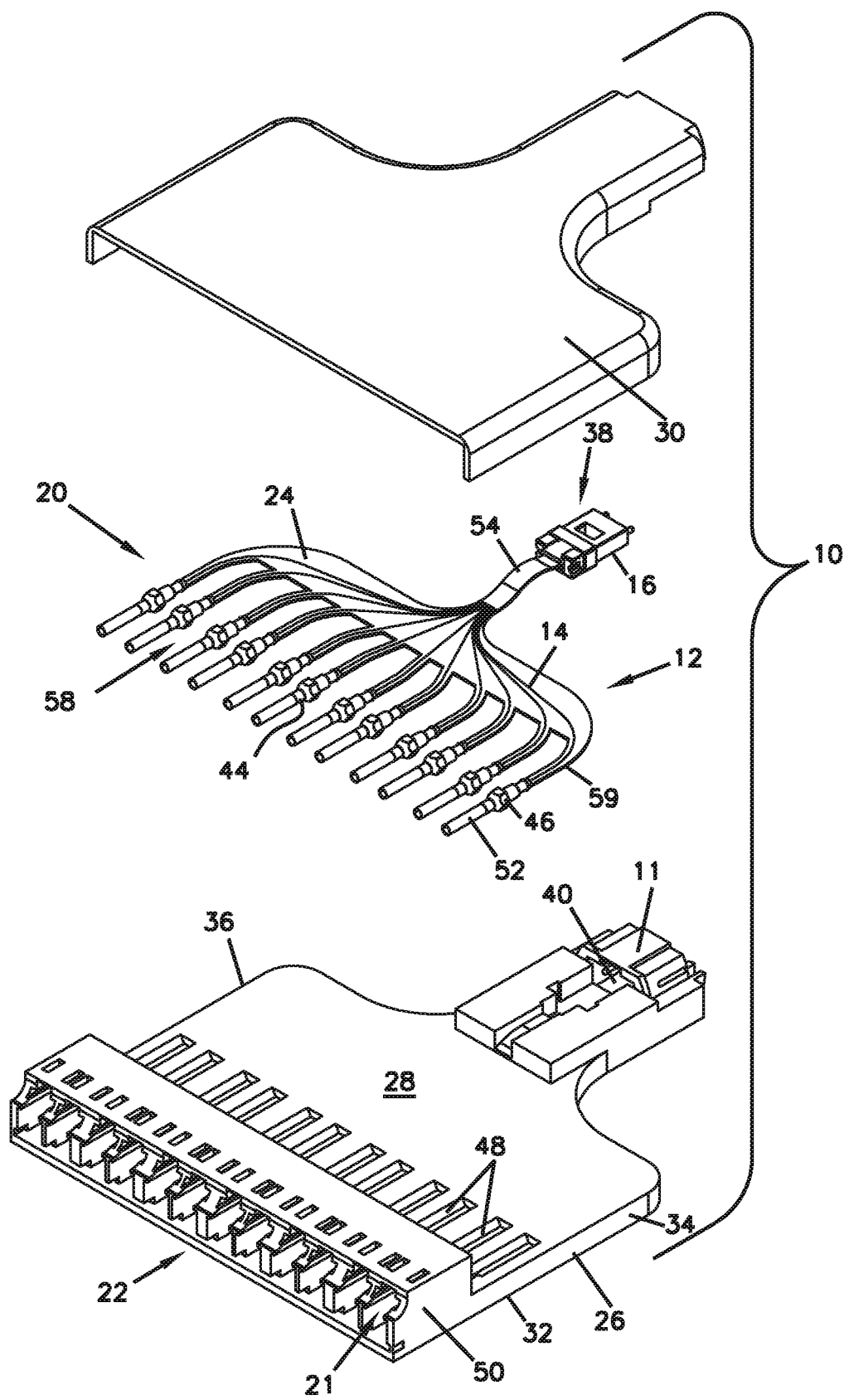
FIG. 2 illustrates the fiber optic cassette of FIG. 1 in an exploded configuration.
Figure 3:
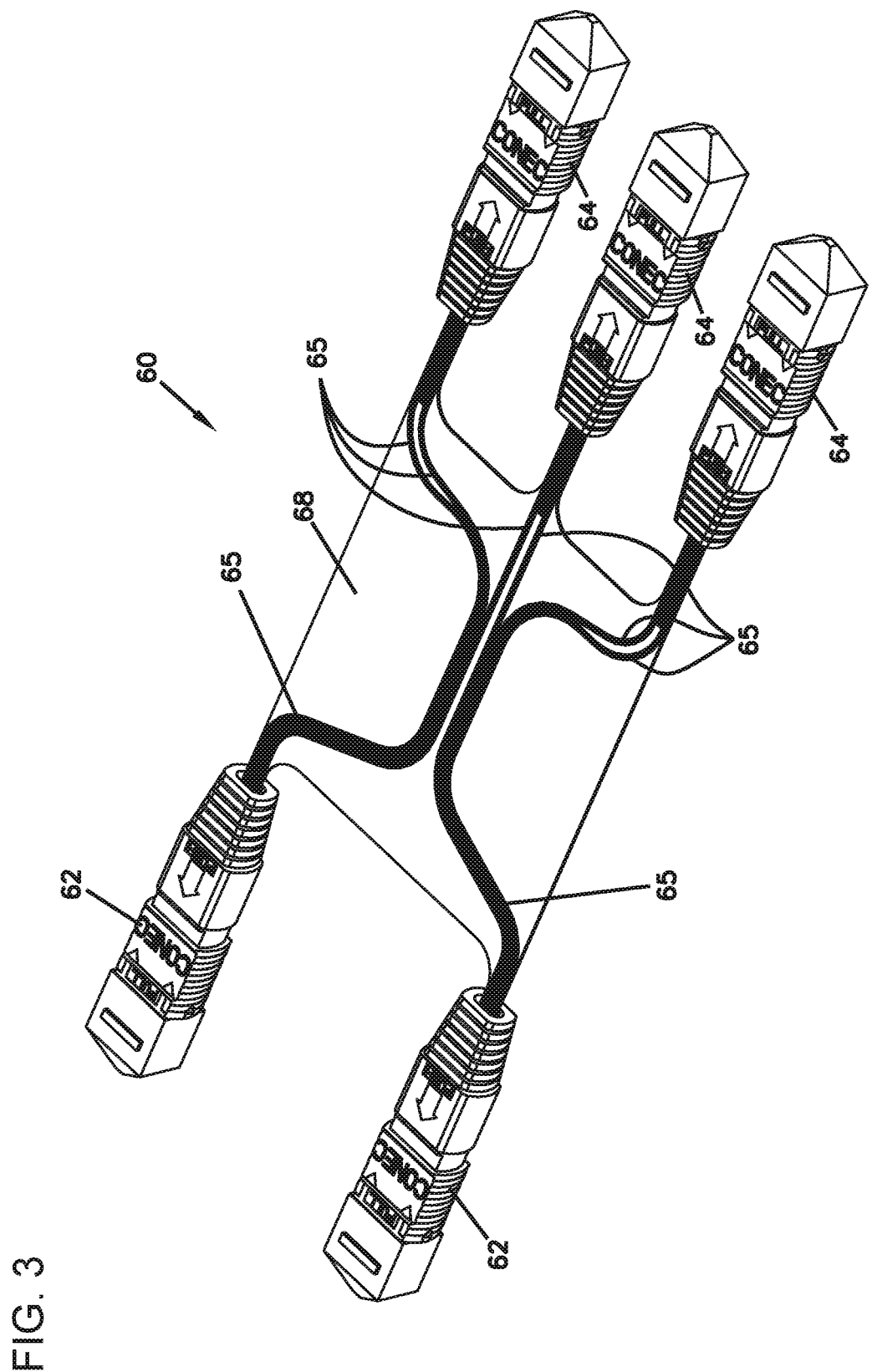
FIG. 3 is a perspective view of an example flexible fiber optic circuit that transitions two multi-fiber connectors to three multi-fiber connectors and that includes dark fibers.
Figure 4:
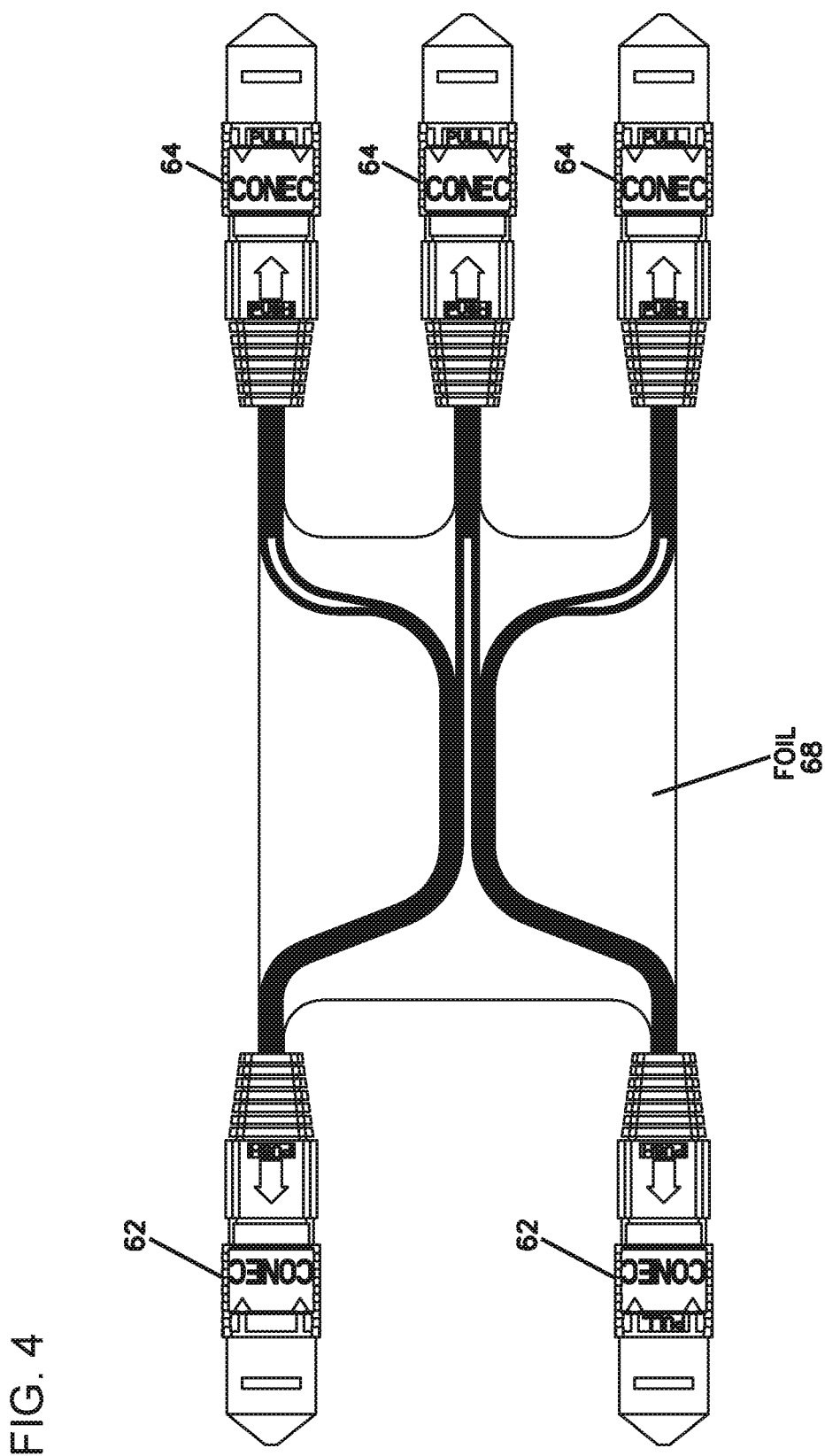
FIG. 4 is a top view of the flexible fiber optic circuit of FIG. 3.

An example of a fiber optic cassette 10 that can utilize the inventive preformed fiber optic circuits of the present disclosure is shown in FIGS. 1-2. In FIG. 2, the cassette 10 is shown with a conventional flexible fiber optic circuit 12. The flexible fiber optic circuit 12 may be replaced with a preformed optical circuit prepared in accordance with the methods of the present disclosure to be discussed in further detail below.

In the fiber optic cassette 10 of FIGS. 1-2, the flexible optical circuit 12 is depicted as transitioning optical fibers 14 between a conventional connector 16 (e.g., an MPO connector) at a rear 18 of the cassette 10 and a plurality of non-conventional connectors 20 at an opposite front end 22 of the cassette 10, wherein portions of a substrate 24 of the flexible optical circuit 12 are physically inserted into the non-conventional connectors 20.

It should be noted that the term "non-conventional connector" may refer to a fiber optic connector that is not of a conventional type such as an LC or SC connector and one that has generally not become a recognizable standard footprint for fiber optic connectivity in the industry.

The elimination of conventional mating connectors inside the cassette 10 may significantly reduce the overall cost by eliminating the skilled labor normally associated with terminating an optical fiber to a connector, including polishing the end face of the fiber and epoxying the fiber into the connector. It further allows the fiber optic interconnect device such as the optical cassette 10 to be made very thin.

Still referring to FIGS. 1-2, the cassette 10 includes a body 26 defining the front 22, the rear 18, and an interior 28. The body 26 further includes a top 30, a bottom 32, and sides 34, 36.

A signal entry location 38 may be provided by the MPO connector 16, which, in the illustrated embodiment, is along the rear 18 of the cassette body 26. A pocket 40 seats an MPO adapter 11 for holding the MPO connector 16. Non-conventional connectors 20 are arranged linearly adjacent the front 22 of the cassette 10. In the depicted embodiment of the cassette 10, the MPO connector 16 of the cassette 10 is positioned to extend generally parallel to ferrules 44 of the non-conventional connectors 20 at the front 22 of the cassette 10.

In general, cassette 10 includes the top 30 and bottom 32 which are generally parallel to each other and define the major surfaces of cassette body 26. Sides 34, 36, front 22, and rear 18 generally define the minor sides of cassette body 26. The cassette 10 can be oriented in any position, so that the top and bottom surfaces can be reversed, or positioned vertically, or at some other orientation.

In the embodiment of the fiber optic cassette 10 shown in FIGS. 1-2, the non-conventional connectors 20 that are positioned adjacent the front 22 of the cassette 10 each define a hub 46 mounted over the ferrule 44. Each ferrule 44 is configured to terminate one of the fibers 14 extending out from the flexible circuit 12.

The non-conventional connectors 20 are placed within pockets 48 provided at a connection block or array 50 located at the front 22 of the cassette 10. A split sleeve 52 is also provided for ferrule alignment between the hub 46 and ferrule 44 of each non-conventional connector 20 and the ferrule of another mating connector that enters the cassette 10 from the front 22.

The mating connectors entering the cassette 10 from the front 22 of the cassette 10 may be connected through fiber optic adapters 21 that are mounted on the connection block 50. The adapters 21 at the front 22 of the cassette 10 allow conventional connectors such as LC connectors to be mated to the non-conventional connectors 20 located within the interior 28 of the cassette 10. Such adapters or adapter blocks may be snap-fit, ultrasonically welded, or otherwise attached to the rest of the cassette body 26. In the illustrated embodiment of the cassette 10 of FIGS. 1-2, the adapters that would be used with the cassette 10 are sized to receive mating LC connectors.

The cassette 10 of FIGS. 1-2 can be sealed or can be openable, so as to allow repair, or cleaning of the inner hubs 46 and ferrules 44. The flexible fiber optic circuit 12 may allow the entire fiber bundle, including the MPO connector 16 to be able to be removed for cleaning or replacement.

The fiber pigtails 14 extending out from a rear end 54 of the substrate 24 forming the flexible optical circuit 12 may be terminated to an MT ferrule of the MPO connector 16. The fiber pigtails 14 extending out from a front end 58 of the substrate 24 are individually terminated to the ferrules 44 to be positioned at the front 22 of the cassette 10. As shown, the substrate 24 defines front extensions 59 (one per fiber 14) each provided in a spaced apart configuration for providing some flexibility to the substrate 24. The individual fibers 14 are separated out from the ribbonized section at the rear 54 of the substrate 24 and are routed through the substrate 24 to the individual front extensions 59. By using a rigid substrate, when the fibers are being terminated to the ferrules 44, the ends of the fibers may be cleaved and ends of all of the ferrules 44 extending from the substrate 24 may be polished simultaneously.

As noted above, the cassette of FIGS. 1-2 is simply one example of a fiber optic cassette that can utilize the inventive preformed fiber optic circuits of the present disclosure. The flexible fiber optic circuit 12 of the cassette 10 may be replaced with a preformed optical circuit prepared in accordance with the methods of the present disclosure to be discussed in further detail below.

Referring now to FIGS. 3-6, another example of a conventional flexible fiber optic circuit 60 that transitions two multi-fiber connectors 62 to three multi-fiber connectors 64 and that includes dark fibers 66 is illustrated. It should be noted that such a flexible circuit is another example of a fiber circuit that can be replaced with a preformed optical circuit prepared in accordance with the methods of the present disclosure to be discussed in further detail below.

Still referring to FIGS. 3-6, in the illustrated example, a flex foil 68 is shown with multiple connectors 62, 64 connected to various fibers 65 organized and supported by the foil 68. As shown, not all of the fibers 65 provided carry signals. Specifically, on the side of the foil 68 with three connectors 64, only eight of the twelve fibers 65 carry signals, and the middle four, are dark fibers 66. If such unused fibers 66 were not present, there is a chance the multi-fiber ferrule could become damaged during polishing.

Figure 5:
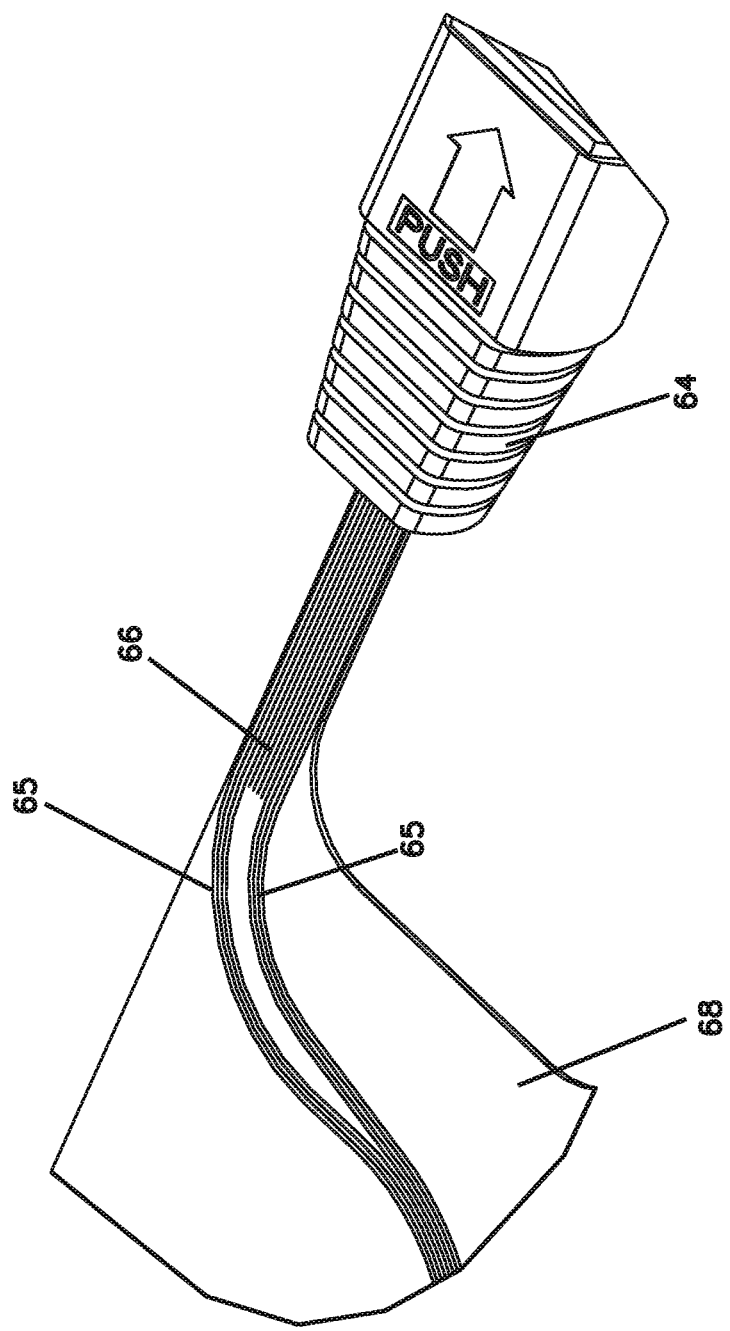
FIG. 5 is an enlarged view of a portion of the flexible fiber optic circuit of FIG. 3, showing the placement of the dark fibers.
Figure 6:
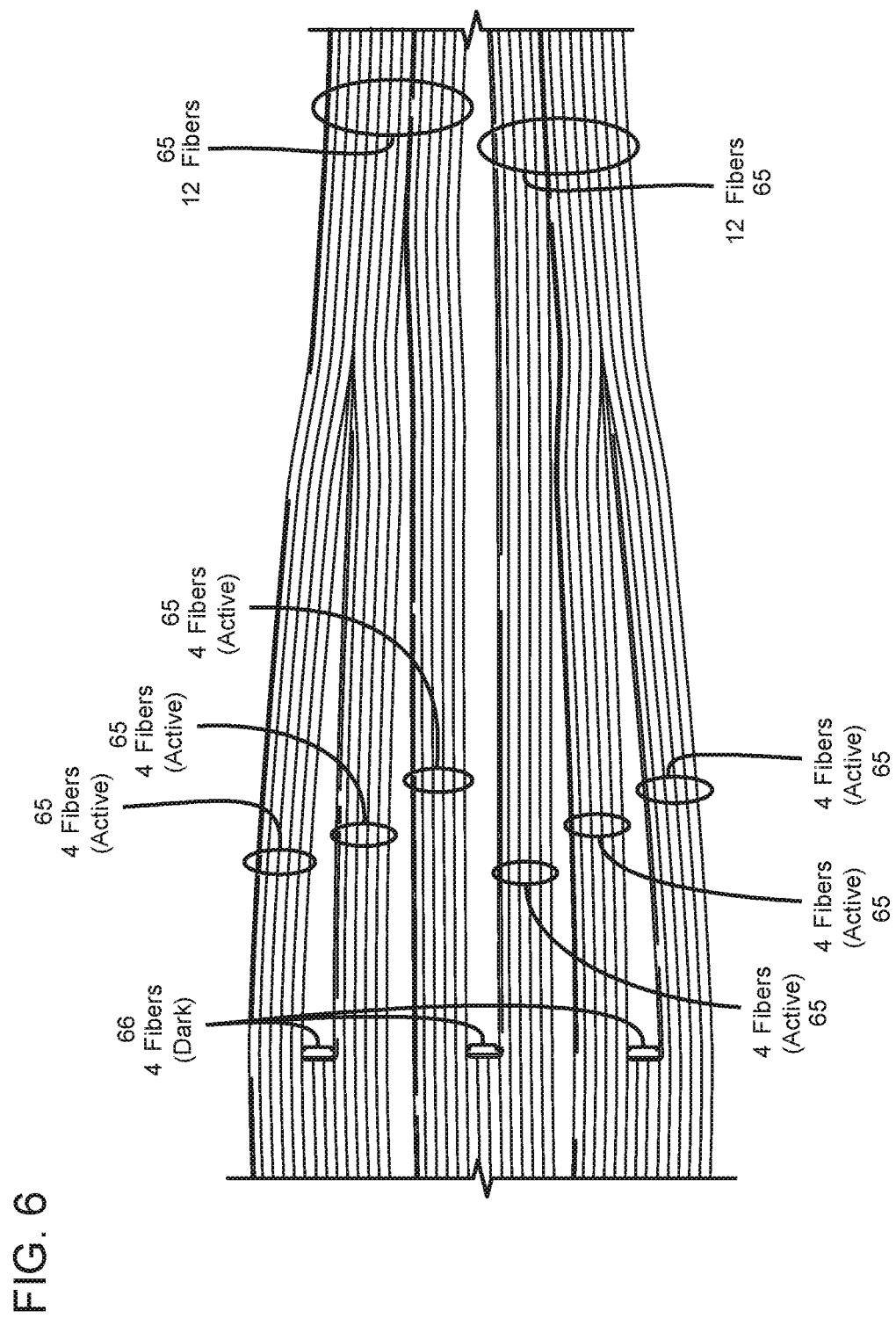
FIG. 6 shows another close up view of an example circuit transitioning fibers from two twelve-fiber connectors to three twelve-fiber connectors, further illustrating the dark fibers.

FIGS. 5-6 specifically provides close-up views illustrating the dark fibers 66 in the transition from the two twelve-fiber connectors 62 to three twelve-fiber connectors 64.

A fiber optic circuit such as the circuit 60 shown in FIGS. 3-6 can be utilized in a piece of fiber optic equipment such as a cassette similar to the cassette 10 of FIGS. 1-2 if the cassette is configured accordingly.

Figure 7:
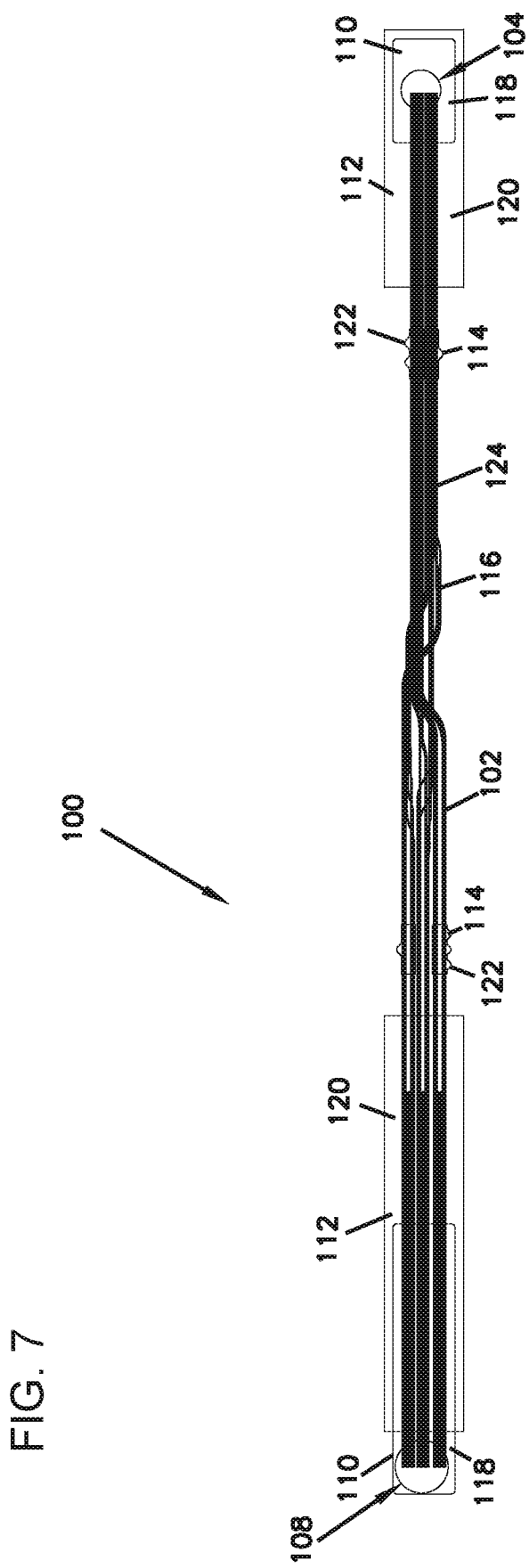
FIG. 7 illustrates an example of a preformed fiber optic circuit transitioning two sets of twelve fibers to three sets of eight fibers, the preformed circuit having features that are examples of inventive aspects in accordance with the present disclosure, wherein the preformed fiber optic circuit can be utilized within a fiber optic cassette such as that shown in FIGS. 1-2.
Figure 8:
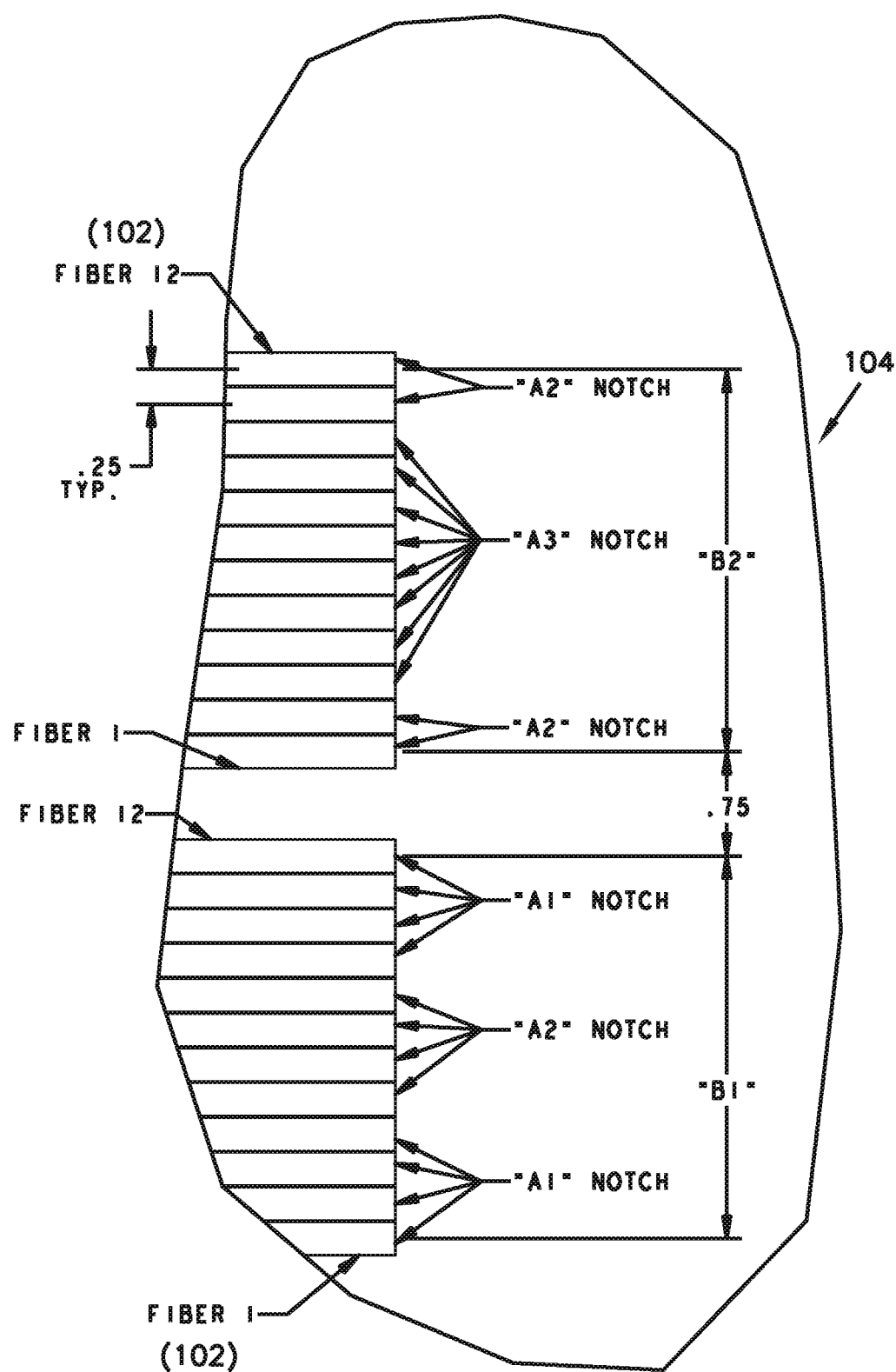
FIG. 8 shows an enlarged view of a first end of the preformed fiber optic circuit of FIG. 7, illustrating the two sets of twelve fibers that are to be terminated to two multi-fiber connectors.
Figure 9:
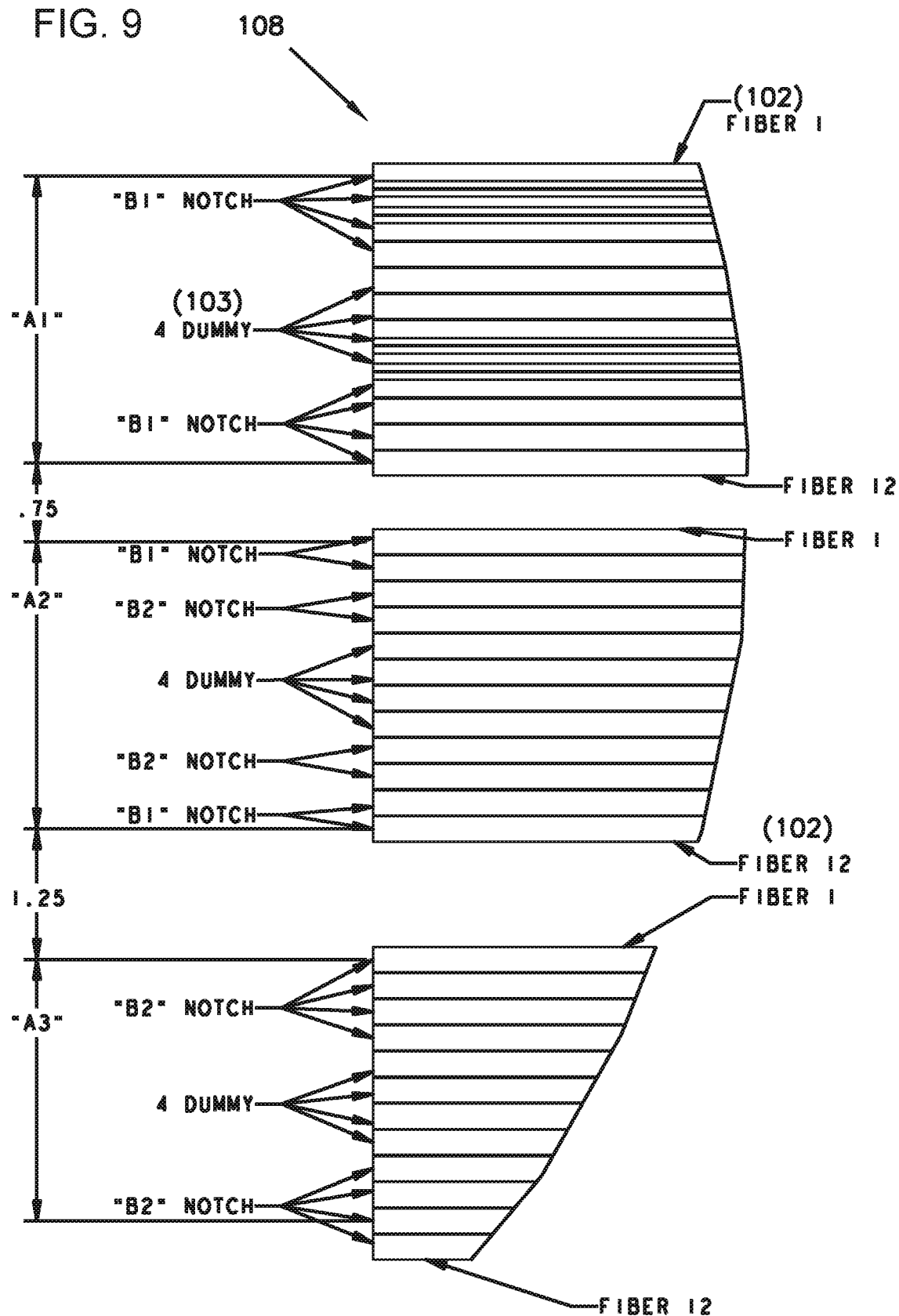
FIG. 9 shows an enlarged view of a second end of the preformed fiber optic circuit of FIG. 7, illustrating the three sets of twelve fibers that are to be terminated to three multi-fiber connectors, wherein four of the fibers for each multi-fiber connector are dummy or dark fibers, resulting in eight active fibers for each of the three multi-fiber connectors.

Referring now to FIGS. 7-9, an example of a preformed fiber optic circuit 100 transitioning two sets of twelve fibers 102 to three sets of eight fibers 102, the preformed circuit 100 having features that are examples of inventive aspects in accordance with the present disclosure, is illustrated. The preformed fiber optic circuit 100 can essentially replace the circuit 60 illustrated in FIGS. 3-6 and can be prepared in accordance with the methods of the present disclosure to be discussed in further detail below. As noted above, the preformed fiber optic circuit 100 of FIGS. 7-9 can be utilized within a fiber optic cassette such as the cassette 10 shown in FIGS. 1-2.

FIG. 8 shows an enlarged view of a first end 104 of the preformed fiber optic circuit 100 of FIG. 7, illustrating the two sets of twelve fibers 102 that are to be terminated to two multi-fiber connectors, and FIG. 9 shows an enlarged view of a second end 108 of the preformed fiber optic circuit 100 of FIG. 7, illustrating the three sets of twelve fibers 102 that are to be terminated to three multi-fiber connectors, wherein four of the fibers 102 for each multi-fiber connector are dummy or dark fibers 103, resulting in eight active fibers 102 for each of the three multi-fiber connectors.

Figure 10:
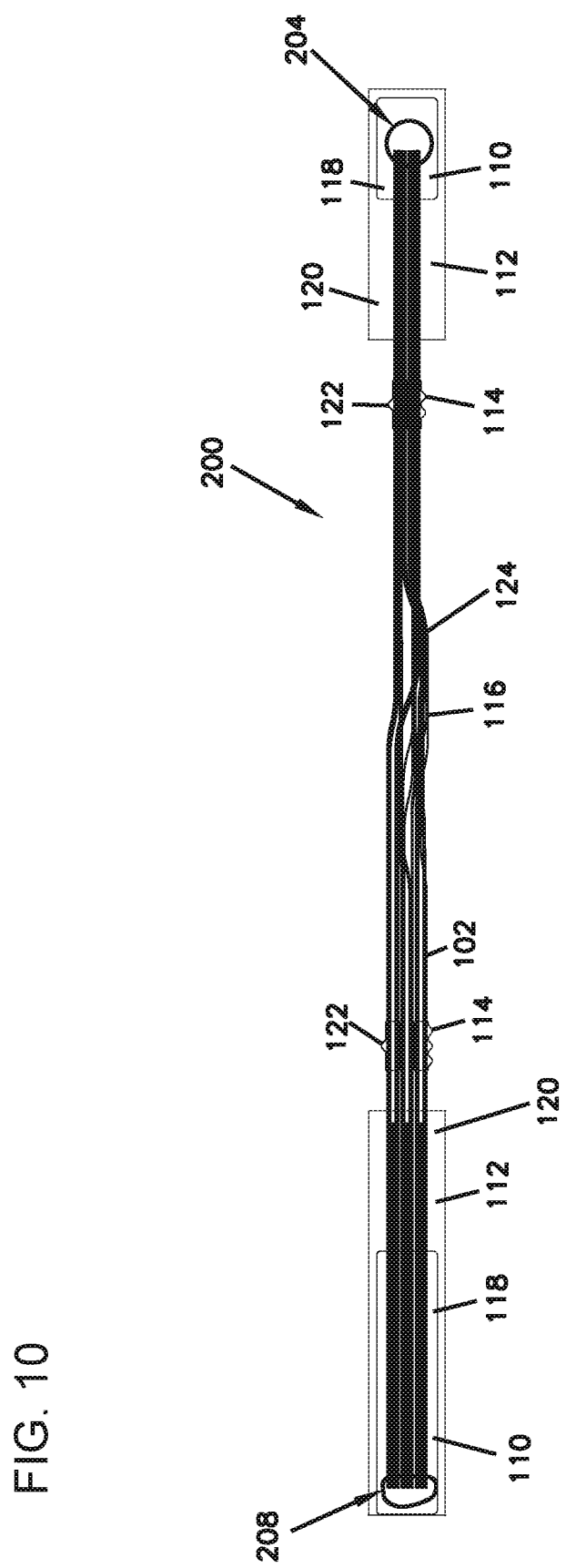
FIG. 10 illustrates another example of a preformed fiber optic circuit similar to that shown in FIGS. 7-9, but transitioning twenty-four fibers to three sets of eight fibers, the preformed circuit having features that are examples of inventive aspects in accordance with the present disclosure, wherein the preformed fiber optic circuit can be utilized within a fiber optic cassette such as that shown in FIGS. 1-2.
Figure 11:
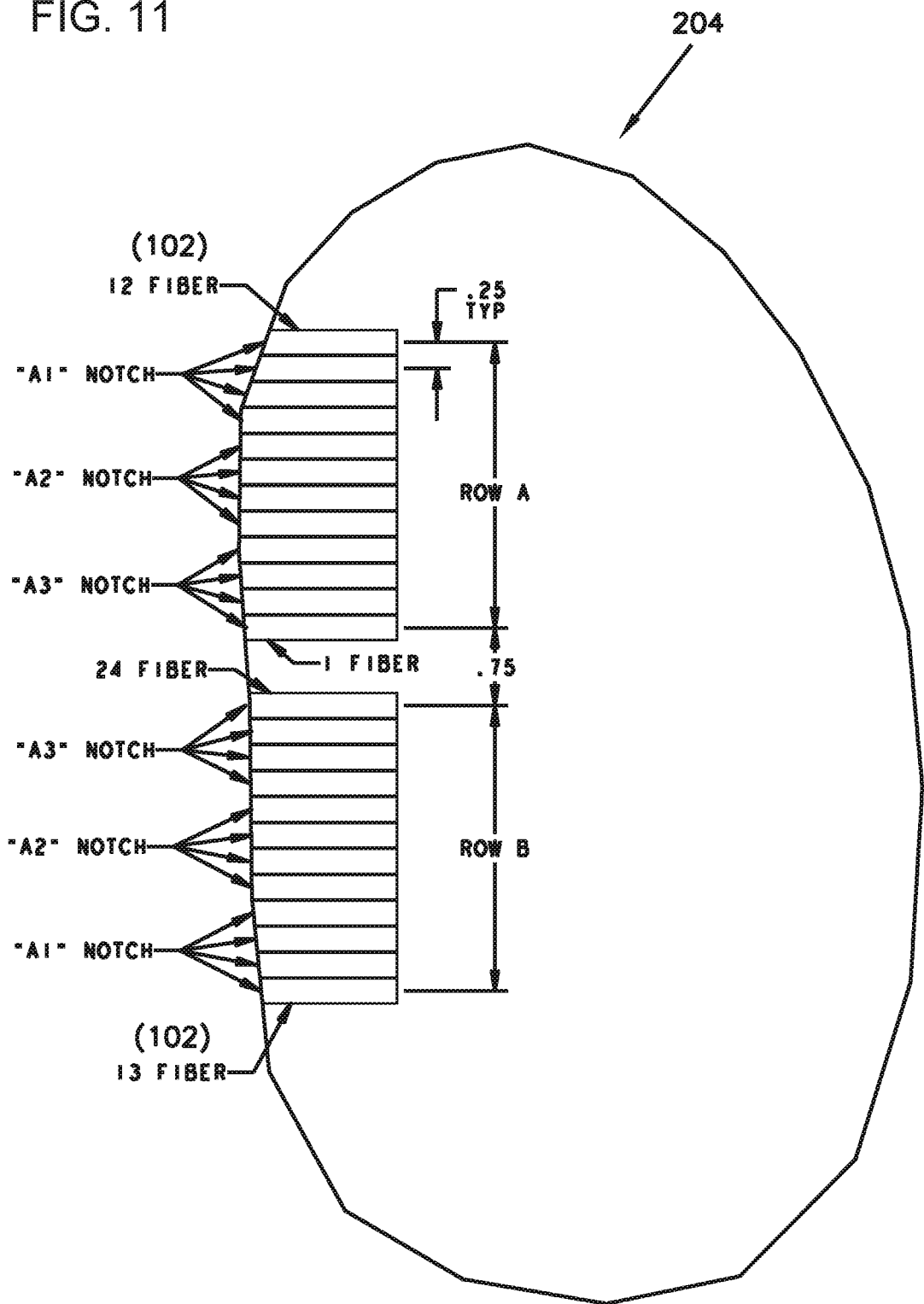
FIG. 11 shows an enlarged view of a first end of the preformed fiber optic circuit of FIG. 10, illustrating the twenty-four fibers that are to be terminated to a multi-fiber connector.
Figure 12:
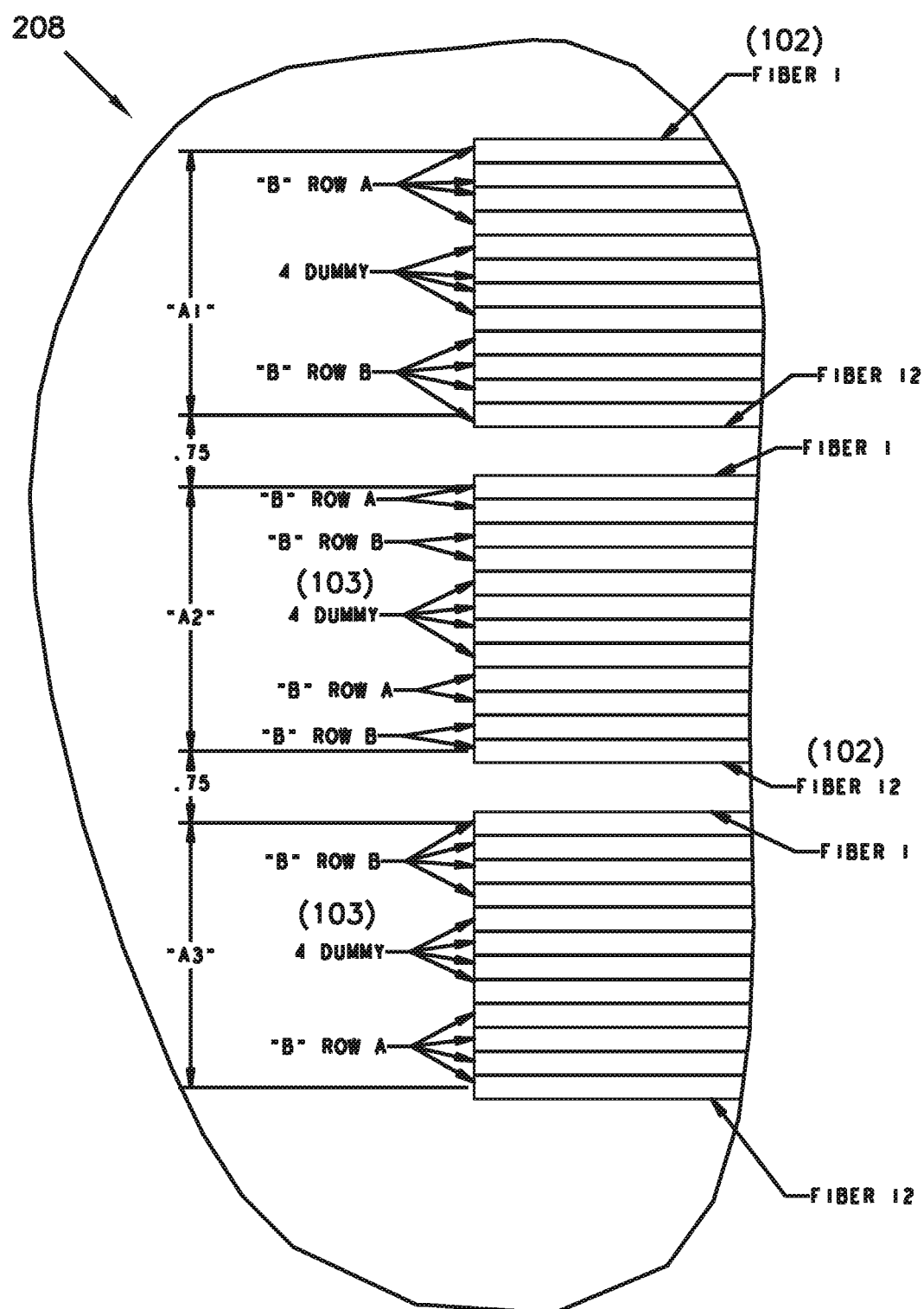
FIG. 12 shows an enlarged view of a second end of the preformed fiber optic circuit of FIG. 10, illustrating the three sets of twelve fibers that are to be terminated to three multi-fiber connectors, wherein four of the fibers for each multi-fiber connector are dummy or dark fibers, resulting in eight active fibers for each of the three multi-fiber connectors.

Referring now to FIGS. 10-12, another example of a preformed fiber optic circuit 200 similar to that shown in FIGS. 7-9, but transitioning twenty-four fibers 102 to three sets of eight fibers 102, the preformed circuit 200 having features that are examples of inventive aspects in accordance with the present disclosure, is illustrated. As noted above, the preformed fiber optic circuit 200 of FIGS. 10-12 can be utilized within a fiber optic cassette such as the cassette 10 shown in FIGS. 1-2.

FIG. 11 shows an enlarged view of a first end 204 of the preformed fiber optic circuit 200 of FIG. 10, illustrating the twenty-four fibers 102 that are to be terminated to a multi-fiber connector, and FIG. 12 shows an enlarged view of a second end 208 of the preformed fiber optic circuit 200 of FIG. 10, illustrating the three sets of twelve fibers 102 that are to be terminated to three multi-fiber connectors, wherein four of the fibers for each multi-fiber connector are dummy or dark fibers 103, resulting in eight active fibers 102 for each of the three multi-fiber connectors.

Each of the preformed fiber optic circuits (100 of FIGS. 7-9 and 200 of FIGS. 10-12) includes a first portion 110, a second portion 112, a third portion 114, and a fourth portion 116. The first portion 110 can be referred to as a flex foil portion 118. The second portion 112 can be referred to as a ribbon portion 120. The third portion 114 can be referred to as an identification flag portion 122. And, the fourth portion 116 can be referred to as a stranded fiber portion 124. It should be noted that the two ends of the preformed fiber optic circuits may be configured in a similar manner since both ends are to be terminated to fiber optic connectors. The stranded fiber portion 124 may be located adjacent the middle of the preformed circuit as shown.

The methods discussed herein with respect to FIGS. 13-24 specifically detail the steps used in preparing the first-fourth portions 110, 112, 114, 116 of the preformed optical circuit 100. Similar steps are applicable to other preformed optical circuits similar in configuration, such as circuit 200.

Figure 20:
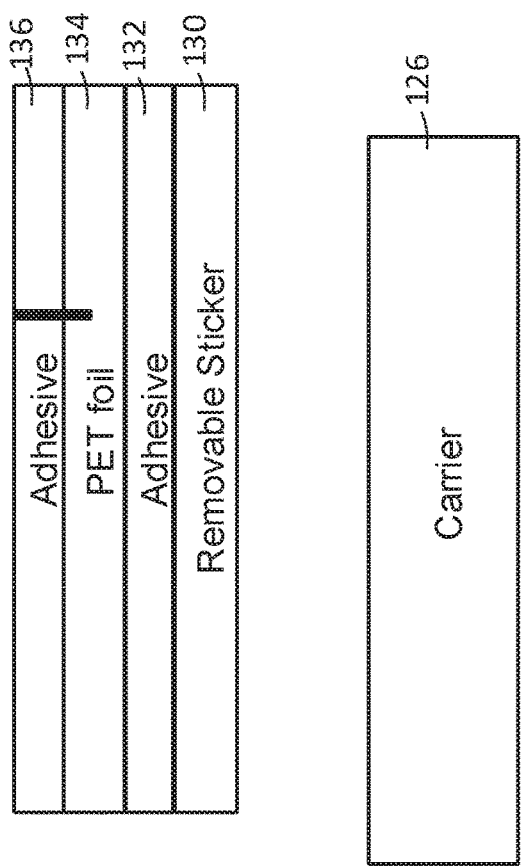
Figure 21:
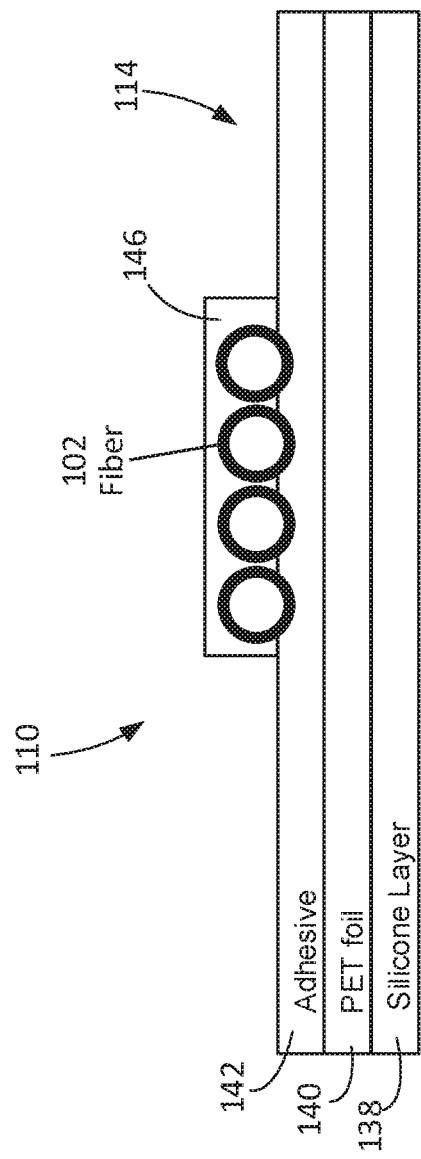
FIG. 21 illustrates at least a portion of the preformed fiber optic circuit prepared in accordance with the method illustrated in FIGS. 13-20, wherein the portion includes a plurality of fibers in a predetermined arrangement supported by a layer of polyethylene terephthalate (PET) foil and coated by a silicone coating.

While FIGS. 13-20 specifically detail the methodology used in preparing the different portions of the preformed fiber optic circuit 100, FIG. 21 specifically illustrates the final configuration of the first portion 110 and the third portion 114 of the preformed fiber optic circuit 100. FIG. 22 specifically illustrates the final configuration of the second portion 112 of the preformed fiber optic circuit 100. And, FIG. 24 specifically illustrates the final configuration of the fourth portion 116 of the preformed fiber optic circuit 100, wherein the stranded fibers 102 are removed from a flexible foil layer 140 and are left as bare fibers 102.

As will be described in further detail below, according to one example embodiment, the flexible foil layer 140 for supporting the fibers 102 may be formed from polyethylene terephthalate (PET). However, it should be understood that PET is simply one non-limiting example polymer that may be used to form the flexible foil of the present disclosure, and other polymers having similar characteristics and that are able to at least semi-rigidly support the fibers in a predetermined orientation are also usable in accordance with the inventive concepts of the present disclosure.

After the preformed fiber circuits 100, 200 of FIGS. 7-9 and 10-12 are prepared in accordance with the methods outlined in FIGS. 13-20, the flex foil portion 118 of the circuit 100/200 is completely removed by a cut that is made at the ribbon portion 120 of the circuit 100/200 between the identification flag portion 122 and the flex foil portion 118. Once the ends of the fibers 102 are prepared at the ribbon portion 120 by cleaving and polishing, the ends are ready to be terminated to a fiber optic connector. The identification flag portion 122 may be left in place as a marker in correctly orienting the fibers 102 from one end of a piece of equipment to an opposite end. The stranded fiber portion 124 is also left as a bare fiber 102. Both of the opposing ends of the preformed fiber optic circuit 100/200 are processed in the same manner as just described.

It should be noted that in certain instances, instead of termination to the ferrules of the fiber optic connectors, the ribbon portion 120 (or even the stranded fiber portion 124) may be connected to other ribbons or connector (multi-fiber/simplex) stub fibers via a splicing operation.

Now referring to FIGS. 13-24, the preparation of the exemplary preformed fiber optic circuits 100/200, including the four different portions 110, 112, 114, 116 is detailed herein.

Figure 13:
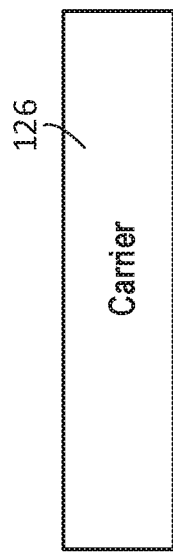

Referring specifically to FIG. 13, a carrier 126 is used to initially support the preformed fiber circuit 100 (or 200) of the present disclosure. According to one example embodiment, the carrier 126 may be a plate with a siliconized top layer and may be provided as part of a piece of equipment or machine that is conventionally used in forming flexible fiber optic circuits.

Figure 14:
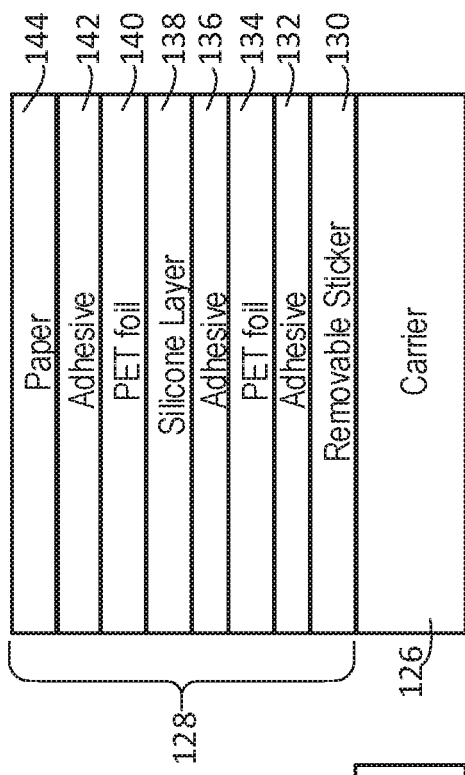
FIGS. 13-20 illustrate an example method of forming the preformed fiber optic circuits of the present disclosure, the method having features that are examples of inventive aspects in accordance with the present disclosure, the method of FIGS. 13-20 usable in forming the example circuits illustrated in FIGS. 7-12.

Referring to FIG. 14, as seen in the diagrammatic view, a substrate 128 including two layers of flexible foil (e.g., PET foil) is provided for initially supporting the preformed fiber optic circuit 100. The two layers of PET foil are stacked and separated by adhesives.

As seen in FIG. 14, when viewed at a transverse cross-section, starting from the bottom carrier 126, the substrate 128 includes a removable sticker layer 130, a first adhesive layer 132, a first layer of PET foil 134, a second adhesive layer 136, a silicone layer 138, a second layer of PET foil 140, a third adhesive layer 142, and a final paper layer 144.

According to example embodiments, the removable sticker layer 130 may be a polyethylene copolymer (PE) layer with an adhesive coating for removability from the carrier 126. In certain embodiments, the removable sticker 130 may have a thickness of around 0.07 millimeters (mm).

The first layer of PET foil 134, as seen, is surrounded by the two adhesive layers 132, 136. The second layer of PET foil 140 may be around 0.05 mm in thickness and have a siliconized side 138 to facilitate release. The third adhesive layer 142 that is on the second layer of PET foil 140 may be an acrylic 200 MP adhesive having a thickness of around 0.13 mm. The top paper layer 144 may be a Polycoated Kraft Paper (PCK) having a thickness of around 0.11 mm.

Figure 15:
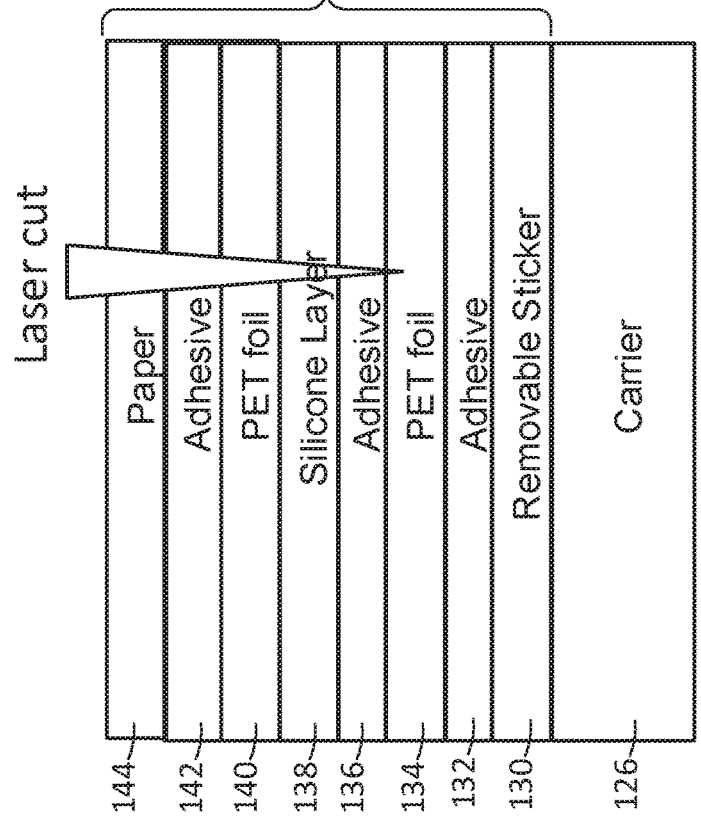

Now referring to FIG. 15, as the next step in the process, a pattern is cut into the top PET foil layer 140 with, for example, a $CO_2$ laser. The cut may extend to the first PET foil layer 134 as shown in FIG. 15. It should be noted that the minimum cut depth preferably extends past the siliconized side 138 of the top PET foil layer 140 to the second adhesive layer 136. And, the maximum cut depth preferably extends past the adhesive 132 at the underside of the first PET foil 134 to the removable sticker layer 130.

As will be described in further detail, the minimum cut depth is set for facilitating removal or peeling of the top PET foil layer 140 for preparing the preformed fiber optic circuit 100 of the present disclosure. The maximum cut depth is set for facilitating removal or peeling of the lower PET foil layer 134 and sticker 130 from the reusable carrier 126, where the lower PET foil layer 134 and the sticker 130 are discharged, as will be discussed.

Figure 16:
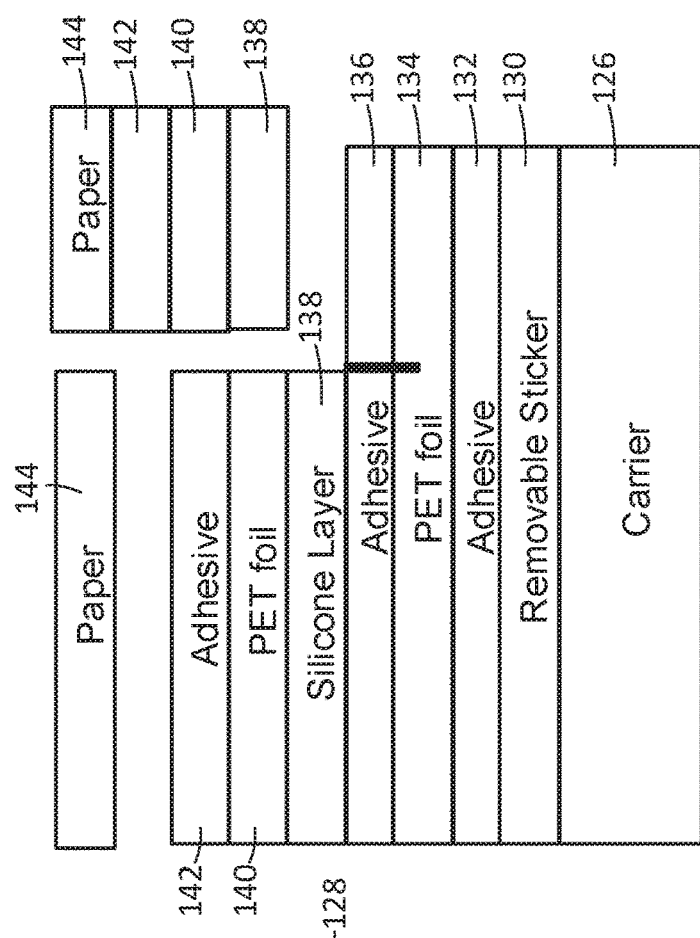

Referring now to FIG. 16, the laser-cut top PET foil layer 140 portions (including the silicone layer 138, the top PET foil layer 140, the third adhesive layer 142, and the paper layer 144) are removed. The uncut portions remain on the substrate 128 as shown. The top paper layer 144 is removed from the entire substrate 128 leaving exposed the third adhesive layer 142 as the top layer on the remaining substrate 128.

Figure 17:
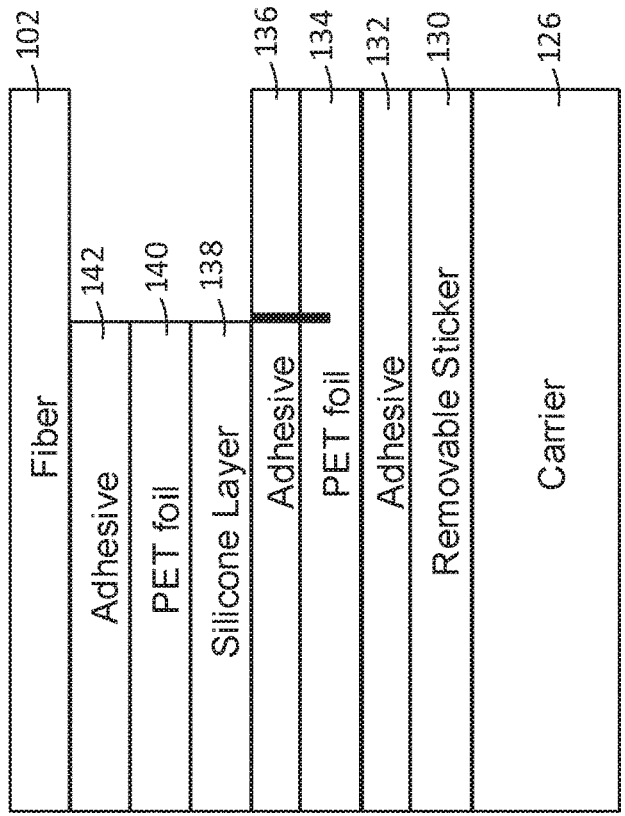

Referring now to FIG. 17, optical fibers 102 (e.g., 0.25 mm fibers) are routed onto the substrate 128 and are held in place by the top adhesive layer 142 and the second adhesive layer 136.

Figure 18:
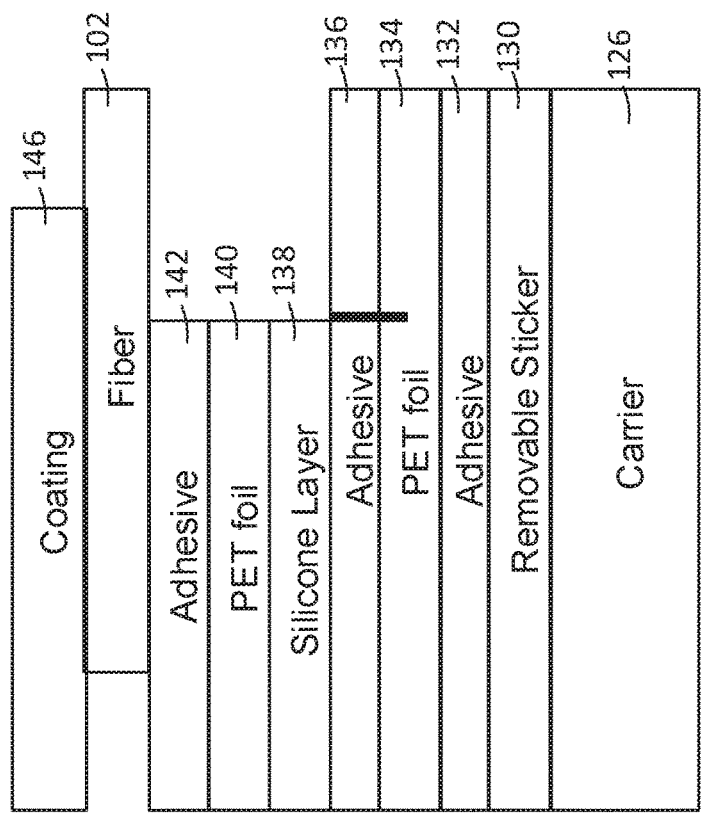

Referring now to FIG. 18, an optional conformal silicone coating 146 may be applied to the fibers 102 at the desired portions of the circuit as will be discussed in further detail below. The silicone coating 146, where applied, is used to supplement the top adhesive layer 142 to fix the fibers 102 onto the top PET foil 140 and to cover the top adhesive layer 142 to limit tackiness.

Figure 19:
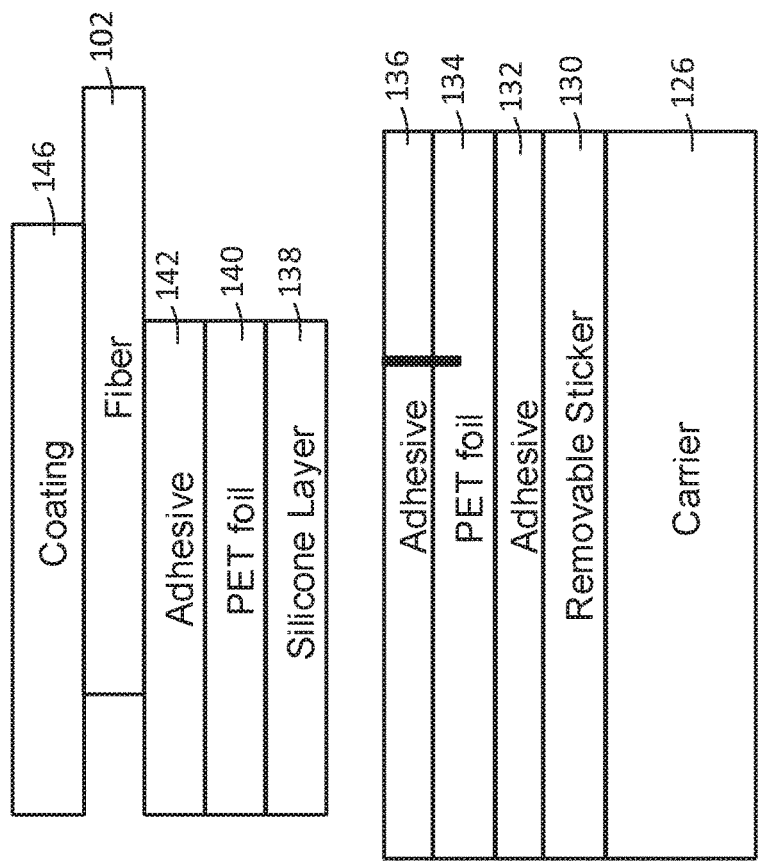

Referring now to FIG. 19, as the next step, the fibers 102 with the top PET foil layer 140 and the silicone coating 146 (if applied) are removed or peeled from the carrier 126 and may form a portion of the preformed fiber optic circuit of the present disclosure.

Referring to FIG. 20, the bottom PET foil layer 134 surrounded by the first and second adhesive layers 132, 136 and the removable sticker layer 130 are removed from the carrier 126 and discarded. As noted above, the carrier 126 with the siliconized surface may be part of a piece of machine or equipment and may be reusable for this process.

FIG. 21 specifically illustrates the final configuration of the first portion 110 and the third portion 114 of the preformed fiber optic circuit 100. As noted previously, the first portion 110 can be referred to as the flex foil portion 118 and the third portion 114 can be referred to as the identification flag portion 122. These first and third portions 110, 114 are illustrated in the preformed fiber optic circuits 100, 200 of FIGS. 7 and 10. The flex foil portion 118 and the identification flag portion 122 both include the silicone coated fibers 102 that are supported by the top PET foil layer 140, wherein the third adhesive layer 142 and the silicone layer 138 surround opposite sides of the PET foil layer 140.

FIG. 22 specifically illustrates the final configuration of the second portion 112 of the preformed fiber optic circuit 100. As noted previously, the second portion 112 can be referred to as the ribbon portion 120. The ribbon portion 120 includes the silicone coated fibers 102 with the remaining top adhesive layer 142. The silicone coating 146 may interact with the adhesive layer 142, and the combination may result in a layer having a thickness of around 0.15-0.20 mm. As shown, the ribbon portion 120 does not include the top PET foil layer 140, which is removed in the process. This process provides a unique and novel method of forming ribbonized fiber.

Figure 24:
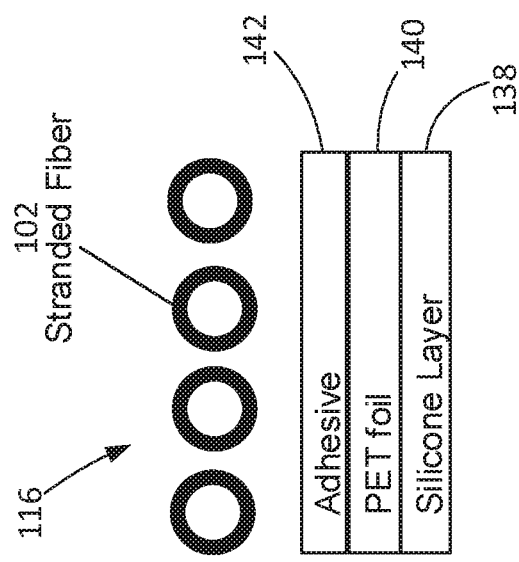
FIG. 24 illustrates at least a portion of the preformed fiber optic circuit prepared in accordance with the method illustrated in FIGS. 13-20, wherein the portion includes the uncoated bare fibers separated from the PET foil of FIG. 23.
Figure 23:
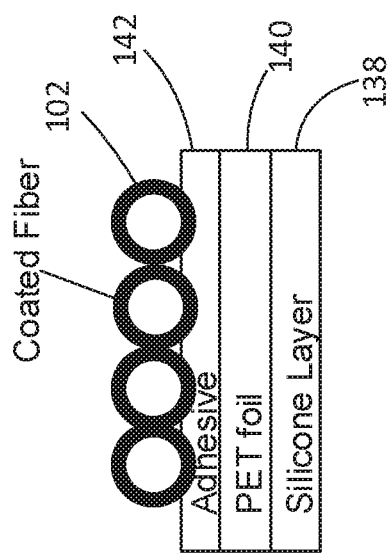
FIG. 23 illustrates at least a portion of the preformed fiber optic circuit prepared in accordance with the method illustrated in FIGS. 13-20, wherein the portion includes a plurality of fibers in a predetermined arrangement supported by a layer of PET foil.

FIGS. 23-24 specifically illustrate the formation of the bare stranded fiber portion 124, also referred to as the fourth portion 116 of the preformed fiber optic circuit 100. The stranded fiber portion 124 starts out with fibers 102 that are routed onto the substrate 128 and are held in place by the top adhesive layer 142 and the second adhesive layer 136. However, unlike the first and third portions 110, 114 of the optical circuit 100, the silicone coating 146 that is shown in the step illustrated in FIG. 18 is not applied. FIG. 23, thus, illustrates the bare fiber 102 with the top PET foil layer 140 (along with the top adhesive layer 142 and the silicone layer 138 at the bottom of the top PET layer 140) that has been removed or peeled from the carrier 126. And, FIG. 24 illustrates the removal of the bare fiber 102 from the adhesive 142 holding the fiber 102 to the top PET foil layer 140 to form the stranded fiber portion 124 of the preformed optical circuit 100.

It should be noted that the process described herein allows the stranded fibers 102 that had been routed in a predetermined configuration on the substrate 128 to maintain their initial configuration, including any fibers 102 that are crossed-over as they extend from one end of the circuit to the opposite end (as shown in the circuits 100, 200 of FIGS. 7-12).

Now referring to FIG. 25, illustrated therein is a hybrid type fiber optic circuit 300 prepared in accordance with the methods of FIGS. 13-20, wherein the hybrid circuit 300 includes both a flex foil portion 118 and a stranded fiber portion 124, wherein the flex foil portion 118 is not necessarily used for identification purposes, but is used to fix the fibers 102 in the predetermined orientation.

In the illustrated fully terminated fiber optic circuit 300, the first ends of the fibers 102 of the circuit 300 are terminated to simplex fiber optic connectors 302 (e.g., LC connectors) and second ends of the fibers 102 of the circuit are terminated to a multi-fiber connector 304. The portion 118 of the hybrid fiber optic circuit 300 adjacent the simplex fiber optic connectors 302 includes a plurality of fibers 102 in a predetermined arrangement supported by a flex foil (e.g., a layer of PET foil 140 and coated by a silicone coating 146), and the portion 124 of the fiber optic circuit 300 adjacent the multi-fiber connector 304 includes a plurality of uncoated bare stranded fibers 102 in a predetermined arrangement. Such a hybrid fiber optic circuit may provide the precision needed at the first end of the circuit 300 with the flex foil, where the fibers are individually terminated to the simplex fiber optic connectors 302 and may provide some flexibility at the second end of the circuit 300, where the bare fibers may have to be manipulated or re-worked in terminating to the multi-fiber connector 304.

Having described the preferred aspects and embodiments of the present disclosure, modifications and equivalents of the disclosed concepts may readily occur to one skilled in the art. However, it is intended that such modifications and equivalents be included within the scope of the claims which are appended hereto. And, although in the foregoing description, terms such as "top," "bottom," "front," "back," "right," "left," "upper," and "lower" may have been used for ease of description and illustration, no restriction is intended by such use of the terms. The telecommunications devices described herein can be used in any orientation, depending upon the desired application.

The invention claimed is:

1. A method of preparing a preformed fiber optic circuit for later termination to at least one fiber optic connector, the method comprising:
providing a substrate for supporting a plurality of optical fibers; and
peeling a layer including optical fibers from the substrate, wherein at least a portion of the peeled layer includes a flexible foil formed from polyethylene terephthalate (PET) that supports the optical fibers peeled off from the substrate, wherein the peeled layer also includes at least a portion made up of optical fibers that are not supported by flexible foil, wherein said plurality of optical fibers that are not supported by a flexible foil are bare fibers, wherein at least a portion of the bare fibers are positioned such that a portion of the layer that includes the PET foil that supports the optical fibers is positioned between the bare fibers and the at least one fiber optic connector to be terminated to the preformed fiber optic circuit.

2. A method according to claim 1, wherein the peeled layer also includes at least a portion coated with a coating including silicone.

3. A method according to claim 1, wherein the peeled layer includes an adhesive.

4. A method according to claim 1, wherein the substrate includes two layers that include PET foil.

5. A method according to claim 1, wherein the peeled layer including the PET foil is used as an identification flag defining indicia for orienting the optical fibers in a correct orientation prior to termination to the at least one fiber optic connector.

6. A method according to claim 1, wherein the substrate includes two layers that include PET foil, the two layers including an upper layer having PET foil that supports the optical fibers peeled off from a lower layer having PET foil that is also peeled from a carrier plate, wherein the lower layer having PET foil is discarded.

7. A method according to claim 6, wherein the two layers having PET foil are initially bonded via an adhesive.

8. A method according to claim 1, wherein the plurality of optical fibers includes at least two fibers that cross over as the fibers extend from a first end to a second end.

9. A preformed fiber optic circuit that is configured for termination to at least one fiber optic connector, the preformed fiber optic circuit comprising:
a plurality of optical fibers arranged in a predetermined arrangement, wherein at least a portion of the optical fibers are supported by a layer of flexible foil and at least a portion are coated by a coating including silicone, wherein the plurality of optical fibers also includes at least a portion not supported by a layer of flexible foil and not coated by a coating including silicone, wherein said plurality of optical fibers that are not supported by the layer of flexible foil and not coated by a coating including silicone are bare fibers, wherein at least a portion of the bare fibers are positioned such that the portion supported by the layer of flexible foil is positioned between the bare fibers and the at least one fiber optic connector to be terminated to the preformed fiber optic circuit.

10. A preformed fiber optic circuit according to claim 9, wherein the flexible foil is formed from polyethylene terephthalate (PET).

11. A preformed fiber optic circuit according to claim 9, wherein the portion coated by the coating including silicone at least partially overlaps the portion supported by the layer of flexible foil.

12. A preformed fiber optic circuit according to claim 11, wherein the portion coated by the coating including silicone that at least partially overlaps the portion supported by the layer of flexible foil is used as an identification flag defining indicia for orienting the fibers in a correct orientation prior to termination to the at least one fiber optic connector.

13. A preformed fiber optic circuit according to claim 9, wherein one end of the optical fibers are terminated by a multi-fiber connector.

14. A preformed fiber optic circuit according to claim 9, wherein one end of each optical fiber is terminated with a simplex fiber optic connector.

15. A preformed fiber optic circuit according to claim 14, wherein the simplex connectors are LC format connectors.

16. A preformed fiber optic circuit according to claim 9, wherein one end of each optical fiber is terminated to a multi-fiber connector and opposite ends are connected to simplex connectors.

17. A preformed fiber optic circuit according to claim 9, wherein the portion of the optical fibers supported by the layer of flexible foil also includes an adhesive between the fibers and the layer of flexible foil.

18. A preformed fiber optic circuit according to claim 9, wherein the plurality of optical fibers includes at least two fibers that cross over as the fibers extend from a first end to a second end.

19. A preformed fiber optic circuit that is configured for termination to at least one fiber optic connector, the preformed fiber optic circuit comprising:
a plurality of optical fibers arranged in a predetermined arrangement, wherein at least a portion of the optical fibers are supported by a layer of flexible foil, wherein the portion supported by the layer of flexible foil is at least partially coated by a coating including silicone, wherein the plurality of optical fibers also includes at least a portion not supported by a layer of flexible foil and not coated by a coating including silicone, wherein the flexible foil is formed from polyethylene terephthalate (PET) and wherein one end of each optical fiber is terminated by a multi-fiber connector.

20. A preformed fiber optic circuit according to claim 19, wherein the portion of the optical fibers supported by the layer of flexible foil also includes an adhesive between the fibers and the layer of flexible foil.

21. A preformed fiber optic circuit according to claim 19, wherein the portion of optical fibers not supported by the layer of flexible foil and not coated by the coating including silicon are bare fibers.

22. A preformed fiber optic circuit according to claim 19, wherein one end of each optical fiber is terminated with a simplex fiber optic connector.

23. A preformed fiber optic circuit according to claim 22, wherein the simplex connectors are LC format connectors.

24. A preformed fiber optic circuit according to claim 19, wherein one end of each optical fiber is terminated to a multi-fiber connector and opposite ends are connected to simplex connectors.

25. A preformed fiber optic circuit according to claim 19, wherein the plurality of optical fibers includes at least two fibers that cross over as the fibers extend from a first end to a second end.

* * * * *

UNITED STATES PATENT AND TRADEMARK OFFICE
CERTIFICATE OF CORRECTION

PATENT NO. : 11,609,400 B2
APPLICATION NO. : 17/855153
DATED : March 21, 2023
INVENTOR(S) : Thomas Marcouiller et al.

Page 1 of 1

It is certified that error appears in the above-identified patent and that said Letters Patent is hereby corrected as shown below:

In the Specification

Column 1, Line 10: "Oct. 2, 2018 which" should read --Oct. 2, 2018; which--

In the Claims

Column 10, Claim 1, Line 13: "supported by flexible" should read --supported by a flexible--

Signed and Sealed this
Twenty-second Day of August, 2023

Katherine Kelly Vidal
Director of the United States Patent and Trademark Office